US008873166B2

(12) United States Patent
Tateyama

(10) Patent No.: US 8,873,166 B2
(45) Date of Patent: Oct. 28, 2014

(54) OBJECTIVE LENS FOR OPTICAL PICKUP DEVICE, AND OPTICAL PICKUP DEVICE

(75) Inventor: Kiyono Tateyama, Hino (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 40 days.

(21) Appl. No.: 13/824,985

(22) PCT Filed: Sep. 27, 2011

(86) PCT No.: PCT/JP2011/071950
§ 371 (c)(1),
(2), (4) Date: Mar. 18, 2013

(87) PCT Pub. No.: WO2012/043506
PCT Pub. Date: Apr. 5, 2012

(65) Prior Publication Data
US 2013/0182337 A1 Jul. 18, 2013

(30) Foreign Application Priority Data

Sep. 29, 2010 (JP) ................................ 2010-219212

(51) Int. Cl.
*G02B 3/02* (2006.01)
*G11B 7/135* (2012.01)
(52) U.S. Cl.
USPC .................... 359/719; 369/44.11; 369/112.01; 369/112.03; 369/112.04; 369/112.05; 369/112.06; 369/112.07; 369/112.08; 369/112.11; 369/112.12; 369/112.13; 369/112.23; 369/112.26; 365/129; 365/215; 359/742

(58) Field of Classification Search
USPC .................. 359/719, 742; 369/44.11, 112.03, 369/112.08, 112.11, 112.13, 112.23, 369/112.26; 365/129, 215
See application file for complete search history.

(56) References Cited

U.S. PATENT DOCUMENTS

| 7,333,416 | B2 * | 2/2008 | Saito et al. ............... 369/112.08 |
| 8,406,111 | B2 * | 3/2013 | Tateyama et al. ......... 369/112.23 |
| 2003/0086354 | A1 * | 5/2003 | Honda ...................... 369/112.08 |
| 2003/0112528 | A1 * | 6/2003 | Sakamoto et al. ............ 359/719 |
| 2003/0223124 | A1 * | 12/2003 | Kitahara et al. .............. 359/719 |
| 2006/0002280 | A1 * | 1/2006 | Ogiwara ................... 369/112.23 |
| 2006/0092815 | A1 * | 5/2006 | Kimura et al. ............ 369/112.08 |
| 2007/0121470 | A1 * | 5/2007 | Nakamura et al. ....... 369/112.01 |
| 2009/0059769 | A1 * | 3/2009 | Taka ........................ 369/112.23 |
| 2009/0147657 | A1 * | 6/2009 | Ikenaka et al. ........... 369/112.01 |
| 2010/0208567 | A1 * | 8/2010 | Nakamura et al. ....... 369/112.03 |

(Continued)

FOREIGN PATENT DOCUMENTS

| JP | 2008-293630 | 12/2008 |
| JP | 2009-093782 | 4/2009 |
| JP | 2010-055732 | 3/2010 |
| WO | WO 2008/007552 | 1/2008 |

*Primary Examiner* — Evelyn A. Lester
(74) *Attorney, Agent, or Firm* — Cozen O'Connor

(57) ABSTRACT

An objective lens for an optical pickup device is characterized in that compatibility of three types of optical discs, which are a BD, a DVD, and a CD, may be realized by a common objective lens, and a flare can be created by providing an over-spherical aberration when a third optical disc is used from a size relationship between a pitch on a central region side and a pitch on an intermediate region side across a boundary and a relationship of a direction of a step in the base structures superimposed in a central region and an intermediate region of the objective lens.

20 Claims, 17 Drawing Sheets

(56) References Cited

U.S. PATENT DOCUMENTS

2010/0260031 A1* 10/2010 Ono et al. ............... 369/112.23
2010/0284259 A1* 11/2010 Nakamura ............... 369/112.03
2010/0284261 A1* 11/2010 Nakamura ............... 369/112.23
2011/0007622 A1* 1/2011 Mimori ................... 369/112.23
2012/0008485 A1* 1/2012 Sano et al. ............... 369/112.23
2012/0182854 A1* 7/2012 Yamamoto et al. ...... 369/112.23

* cited by examiner

OPTICAL AXIS
OA

OPTICAL AXIS
OA

---------------------------------- OPTICAL AXIS OA

---------------------------------- OPTICAL AXIS OA

EXAMPLE 5 CD

OBJECTIVE LENS FOR OPTICAL PICKUP DEVICE, AND OPTICAL PICKUP DEVICE

RELATED APPLICATIONS

This is a U.S. national stage of application No. PCT/JP2011/071950 filed on Sep. 27, 2011.

This patent application claims the priority of Japanese application no. 2010-219212 filed Sep. 29, 2010, the disclosure content of which is hereby incorporated by reference.

1. Technical Field

The present invention relates to an optical pickup device capable of compatibly recording and/or reproducing information on/from different types of optical discs (record/reproduction) and an objective lens.

2. Background Art

Recently, a wavelength of a laser light source used as a light source for reproducing information recorded on the optical disc and recording the information on the optical disc becomes shorter in the optical pickup device and the laser light source at a wavelength of 390 to 415 nm such as a blue-violet semiconductor laser, for example, is put into practical use. By using the blue-violet laser light source, recording of information of 15 to 20 GB on the optical disc with a diameter of 12 cm becomes possible when an objective lens with same numerical aperture (NA) as that of a DVD (digital versatile disc) is used and the recording of the information of 23 to 25 GB on the optical disc with a diameter of 12 cm becomes possible when NA of an objective optical element is increased up to 0.85.

An example of the optical disc using the objective lens with NA of 0.85 as described above includes a BD (Blu-ray disc). Since a coma aberration occurring due to inclination (skew) of the optical disc increases, a protective substrate is designed to be thinner in the BD than that in the DVD (0.1 mm relative to 0.6 mm in the DVD) so as to decrease an amount of coma aberration due to the skew.

A value as a product of an optical disc player/recorder (optical information recording/reproducing device) is not sufficient only by appropriate recording/reproduction, capability of the information on/from the BD. Today, based on a fact that the DVD and a CD (compact disc) on which various pieces of information are recorded are sold, the recording/reproduction of the information on/from the BD is not sufficient and the appropriate recording/reproduction of the information also on/from the DVD and the CD of a user, for example, will improve a commodity value as the optical disc player/recorder for the BD. From such a background, the optical pickup device mounted on the optical disc player/recorder for the BD is desired to have a performance capable of appropriately recording/reproducing the information on any of the BD, the DVD, and the CD while maintaining compatibility.

A method of appropriately recording/reproducing the information on/from any of the BD, DVD, and CD while maintaining compatibility includes a method of selectively switching an optical system for the BD and the optical system for the DVD and CD according to recording density of the optical disc on/from which the information is recorded/reproduced. However, a plurality of optical systems becomes necessary for such a method, so that it is not advantageous for a compact device and a cost thereof increases.

Therefore, in order to simplify a configuration of the optical pickup device to realize a cost reduction, it is preferable to decrease the number of optical components composing the optical pickup device as much as possible by making the optical system for the BD and the optical system for the DVD and CD to be common also in a compatible optical pickup device. To provide a common objective lens arranged so as to be opposed to the optical disc is most advantageous for simplifying the configuration of the optical pickup device and realizing the cost reduction. In order to obtain a common objective lens for the optical discs of a plurality of types with different recording/reproducing wavelengths, it is required to form a diffraction structure having wavelength dependency of a spherical aberration on the objective lens.

Patent Literature 1 discloses an objective lens, which realizes compatibility of first to third optical discs with different recording densities in a central region and satisfies both of the compatibility of the first and second optical discs and flaring of unnecessary light when a third optical disc is used for aperture control in an intermediate region by changing a combination of diffraction structures of the central region and the intermediate region out of three separated regions of an optical surface. Patent Literature 2 discloses an objective lens, which realizes compatibility of the three different types of optical discs in the central region and satisfies both of the compatibility of two different types of optical discs and the flaring of the unnecessary light when a remaining optical disc is used for the aperture control in the intermediate region, by using a common diffraction structure in the central region and the intermediate region but superimposing another diffraction structure only on the central region out of the three separated regions of the optical surface.

CITATION LIST

Patent Literature

Patent Literature 1: Japanese Patent Application Laid-Open (JP-A) No. 2009-93782
Patent Literature 2: JP-A No. 2010-55732

SUMMARY OF INVENTION

Technical Problem

Herein, since the objective lens of Patent Literature 1 adopts the diffraction structure in which an order of diffracted light with the highest light intensity is different between the central region and the intermediate region, there may be a case in which a high-order aberration occurs and the spherical aberration becomes discontinuous when temperature changes and a wavelength of the light source changes and an appropriate light converging spot cannot be formed. In the objective lens of Patent Literature 2, a structure, which is not present in the intermediate region, is superimposed in the central region, so that a problem that the high-order aberration occurs when the temperature changes and the wavelength of the light source changes are generated. Further, since only one diffraction structure, which generates a second-order diffracted light as the strongest diffracted light when a light flux at a first wavelength enters and generates a first-order diffracted light as the strongest diffracted light when a light flux at a second wavelength enters, is used for realizing the compatibility of two different types of optical discs, which are the BD and the DVD, diffraction power is determined according to the wavelength and a wavelength property (ratio of change of the diffraction efficiency to change of wavelength of the light source) and a temperature property (ratio of change of the diffraction efficiency to change of temperature) are uniquely determined, so that balance adjustment becomes difficult and a degree of freedom of design of the objective lens is deteriorated. Further, since a binary-type diffraction structure (which generates 0-th order diffracted light as the strongest diffracted light when the light flux at the first wavelength enters, generates the 0-th order diffracted light as the strongest diffracted light when the light flux at the second wavelength enters, and generates first-order diffracted light as the strongest diffracted light when the light flux at a third wavelength enters) is superimposed in the central region, a step of the diffraction structure increases and formability decreases, and deterioration in diffraction efficiency due to a manufacturing error might occur and further, there is a problem that a fluctuation width of the diffraction efficiency becomes larger during fluctuation in wavelength.

The present invention is made for solving the above-described problem and an object of the present invention is to provide the objective lens for an optical pickup device capable of realizing compatibility of the three types of optical discs, which are the BD, DVD, and CD, for example, by a common objective lens and ensuring excellent balance between the wavelength property and the temperature property in which occurrence of the high-order spherical aberration is inhibited even when the temperature and the wavelength of the light source changed, and the optical pickup device using the same.

Means to Solve the Problem

According to an objective lens of claim 1 of the invention, provided is an objective lens used in an optical pickup device. The optical pickup device includes a first light source which emits a first light flux at a first wavelength λ1 (nm), a second light source which emits a second light flux at a second wavelength λ2 (nm) (λ2>λ1), and a third light source which emits a third light flux at a third wavelength λ3 (nm) (λ3>λ2) for recording and/or reproducing information of a first optical disc including a protective substrate with a thickness of t1 by using the first light flux, recording and/or reproducing information of a second optical disc including a protective substrate with a thickness of t2 (t1<t2) by using the second light flux, and recording and/or reproducing information of a third optical disc including a protective substrate with a thickness of t3 (t2<t3) by using the third light flux. The objective lens includes an optical surface.

The objective lens is a single lens, and the optical surface includes at least a central region, an intermediate region around the central region, and a peripheral region around the intermediate region.

The objective lens converges the first light flux, which passes through the central region, on an information recording surface of the first optical disc such that the information is recorded and/or reproduced, converges the second light flux, which passes through the central region, on an information recording surface of the second optical disc such that the information is recorded and/or reproduced, and converges the third light flux, which passes through the central region, on an information recording surface of the third optical disc such that the information is recorded and/or reproduced.

The objective lens converges the first light flux, which passes through the intermediate region, on the information recording surface of the first optical disc such that the information is recorded and/or reproduced, converges the second light flux, which passes through the intermediate region, on the information recording surface of the second optical disc such that the information is recorded and/or reproduced, and does not converge the third light flux, which passes through the intermediate region, on the information recording surface of the third optical disc such that the information is recorded and/or reproduced.

The objective lens converges the first light flux, which passes through the peripheral region, on the information recording surface of the first optical disc such that the information is recorded and/or reproduced, does not converge the second light flux, which passes through the peripheral region, on the information recording surface of the second optical disc such that the information is recorded and/or reproduced, and does not converge the third light flux, which passes through the peripheral region on the information recording surface of the third optical disc such that the information is recorded and/or reproduced.

The central region includes a first optical path difference providing structure obtained by superimposing a first base structure, which is a blazed structure, and a second base structure, which is the blazed structure, on each other.

The intermediate region includes a second optical path difference providing structure obtained by superimposing a third base structure, which is the blazed structure, and a fourth base structure, which is the blazed structure, on each other.

The first base structure makes an amount of A-th order diffracted light of the first light flux, which passes through the first base structure, larger than an amount of diffracted light of any other order, makes an amount of B-th order diffracted light of the second light flux, which passes through the first base structure, larger than the amount of the diffracted light of any other order, and makes an amount of C-th order diffracted light of the third light flux, which passes through the first base structure, larger than the amount of the diffracted light of any other order.

The second base structure makes an amount of D-th order diffracted light of the first light flux, which passes through the second base structure, larger than the amount of the diffracted light of any other order, makes an amount of E-th order diffracted light of the second light flux, which passes through the second base structure, larger than the amount of the diffracted light of any other order, and makes an amount of F-th order diffracted light of the third light flux, which passes through the second base structure, larger than the amount of the diffracted light of any other order.

The third base structure makes the amount of A-th order diffracted light of the first light flux, which passes through the third base structure, larger than the amount of the diffracted light of any other order, makes the amount of B-th order diffracted light of the second light flux, which passes through the third base structure, larger than the amount of the diffracted light of any other order, and makes the amount of C-th order diffracted light of the third light flux, which passes through the third base structure, larger than the amount of the diffracted light of any other order.

The fourth base structure makes the amount of D-th order diffracted light of the first light flux, which passes through the fourth base structure, larger than the amount of the diffracted light of any other order, makes the amount of E-th order diffracted light of the second light flux, which passes through the fourth base structure, larger than the amount of the diffracted light of any other order, and makes the amount of F-th order diffracted light of the third light flux, which passes through the fourth base structure, larger than the amount of the diffracted light of any other order.

A, B, C, D, E, and F satisfy
|A|=1,
|B|=1,
|C|=1,
|D|=2,
|E|=1, and
|F|=1, respectively, and
a pitch of each of the first base structure, the second base structure, the third base structure, and the fourth base structure is with a positive sign when a step of the base structure faces opposite to an optical axis and with a negative sign when the step of the base structure faces to the optical axis, a pitch P2 of the second base structure in a position closest to a boundary and a pitch P4 of the fourth base structure in a position closest to the boundary across the boundary between the central region and the intermediate region satisfy a following equation (1) in consideration of the sign of the pitch:

$$P4-P2<0 \qquad (1)$$

where, pitch $P(h)=\lambda B/(\Sigma(2i \times C_{2i} \times h^{2i-1}))$ is satisfied when an optical path difference function, which defines the base structure, is represented by $\Phi(h)=\Sigma(C_{2i} h^{2i} \times \lambda \times m/\lambda B)$, where $\lambda$ represents a wavelength used, m represents a diffraction order, $\lambda B$ represents a manufacturing wavelength, and h represents a distance in a direction perpendicular to the optical axis from the optical axis. Here, the term "manufacturing wavelength" is herein intended to mean a wavelength of the light flux of which m-th order diffraction efficiency becomes the highest when this passes through the base structure.

The present invention is hereinafter described; it is described assuming that the first optical disc is a BD, the second optical disc is a DVD, and the third optical disc is a CD for convenience. It is possible to realize a continuous spherical aberration for the light flux, which passes through the central region and the intermediate region, by making the order of the diffracted light with the highest light intensity of the first base structure and that of the third base structure be the same and making the order of the diffracted light with the highest light intensity of the second base structure and that of the fourth base structure be the same. As a result, it is possible to preferably inhibit occurrence of a high-order aberration even when a temperature and a wavelength changed. However, a problem still remains how to create a flare when the CD is used without further superimposing the base structure for creating the flare when the CD is used on the central region or the intermediate region.

First, the inventor of the present invention selects a combination in which 1/1/1 (first-order diffracted light is generated the most in any of the first light flux, the second light flux, and the third light flux) is used as the first and third base structures and 2/1/1 (second-order diffracted light is generated the most in the first light flux and the first-order diffracted light is generated the most in the second light flux and the third light flux) is used as the second and fourth base structures as compatible base structures. The reason is because, first, deterioration in efficiency when the wavelength and the temperature changed may be prevented by using the blazed structure with a small step amount (height of the step in an optical axis direction) and deterioration in light use efficiency due to a shadow effect and a manufacturing error may also be prevented, and second, all three wavelengths have high diffraction efficiency. Further, the inventor found that it was possible to provide an over-spherical aberration to the light flux, which passes through the intermediate region when using the third optical disc, by defining a size relationship between the pitch on a central region side and the pitch on an intermediate region side across the boundary and a relationship of the direction of the step to a certain relationship in the two base structures, thereby creating the flare without superimposing another base structure. That is to say, when BD/DVD/CD compatibility in the central region is realized by summing (a) an over-spherical aberration generated on a parent aspherical surface of the objective lens, which is a convex lens, (b) an under-spherical aberration of the 1/1/1 base structure, and (c) an under-spherical aberration of the 2/1/1 base structure, since the pitch P2 of the second base structure in the position closest to the boundary and the pitch P4 of the fourth base structure in the position closest to the boundary across the boundary between the central region and the intermediate region satisfy P4−P2<0, in the vicinity of the boundary of the central region and the intermediate region, the power of the intermediate region (fourth base structure) becomes smaller than the power of the central region (second base structure) in the vicinity of the boundary, so that a spherical aberration correcting effect is smaller in the vicinity of the boundary of the intermediate region than in the vicinity of the boundary of the central region (spherical aberration of (c) is small). Therefore, the over-spherical aberration of (a) remains in the vicinity of the boundary of the intermediate region and it becomes possible to create the flare when the CD is used.

A combination of the size relationship between the pitch P2 of the second base structure in the position closest to the boundary on the central region side and the pitch P4 of the fourth base structure in the position closest to the boundary on the intermediate region side and the relationship of the direction of the step, which generates the over-spherical aberration when the CD is used, is described. FIGS. 16, 17, and 18 are graphs in which the pitch P (mm) is plotted along the ordinate and the height h (mm) from the optical axis is plotted along the abscissa and a left side of a boundary BN represents the central region and a right side thereof represents the intermediate region. Herein, the second base structure and the fourth base structure are referred to as (2/1/1) diffraction structures for convenience. Meanwhile, a negative (−) sign of the pitch indicates that the step of the base structure faces in the direction of the optical axis and a positive (+) sign of the pitch indicates that the step of the base structure faces in the direction opposite to the optical axis.

The inventor of the present invention studied the combination of the size relationship between the pitch P2 of the second base structure in the position closest to the boundary on the central region side and the pitch P4 of the fourth base structure in the position closest to the boundary on the intermediate region side and the relationship of the direction of the step while dividing a focal distance f1 of the objective lens in the first light flux into predetermined ranges. FIG. 17 illustrates an example of the combination of the size relationship between the pitch P2 of the second base structure in the position closest to the boundary on the central region side and the pitch P4 of the fourth base structure in the position closest to the boundary on the intermediate region side and the relationship of the direction of the step, which might generate the over-spherical aberration when the CD is used, in a case in which the focal distance f1 is very short as 1.0 to 1.8 mm. More specifically, in a case illustrated in FIG. 17, |P2|>|P4| is satisfied and the sign of the pitch is positive in the (2/1/1) diffraction structure. Therefore, [the pitch P4 of the fourth base structure in the position closest to the boundary of the intermediate region including the sign]−[the pitch P2 of the second base structure in the position closest to the boundary of the central region including the sign] in the (2/1/1) diffraction structure=P4−P2<0 is satisfied. That is to say, the equation (1) is satisfied.

FIG. 16 illustrates an example of the combination of the size relationship between the pitch P2 of the second base structure in the position closest to the boundary on the central region side and the pitch P4 of the fourth base structure in the position closest to the boundary on the intermediate region side and the relationship of the direction of the step, which might generate the over-spherical aberration when the CD is used, in a case in which the focal distance f1 of the objective lens in the first light flux is relatively short as 1.2 to 2.5 mm. More specifically, in the (2/1/1) diffraction structure illustrated in FIG. 16, |P2|<|P4| is satisfied and the sign of the pitch is negative. Therefore, [the pitch P4 of the fourth base structure in the position closest to the boundary of the intermediate region including the sign]–[the pitch P2 of the second base structure in the position closest to the boundary of the central region including the sign] in the (2/1/1) diffraction structure=(−|P4|)−(−|P2|)<0 is satisfied. That is to say, the equation (1) is satisfied.

FIG. 18 illustrates the combination of the size relation between the pitch P2 of the second base structure in the position closest to the boundary on the central region side and the pitch P4 of the fourth base structure in the position closest to the boundary on the intermediate region side and the relationship of the direction of the step, which might generate the over-spherical aberration when the CD is used, in a case in which the focal distance f1 of the objective lens in the first light flux is relatively long as 2.0 to 3.5 mm. More specifically, in the (2/1/1) diffraction structure illustrated in FIG. 18, |P2|<|P4| is satisfied and the sign of the pitch is negative. Therefore, [the pitch P4 of the fourth base structure in the position closest to the boundary of the intermediate region including the sign]–[the pitch P2 of the second base structure in the position closest to the boundary of the central region including the sign] in the (2/1/1) diffraction structure=(−|P4|)−(−|P2|)<0 is satisfied. That is to say, the equation (1) is satisfied. That is to say, it is understood that the over-spherical aberration may be generated when the CD is used when the equation (1) is satisfied regardless of the length of the focal distance f1.

The sign of the pitch in the position closest to the boundary changes according to the focal distance in this manner; this is because paraxial power of the 2/1/1 structure is utilized for ensuring a working distance when the CD is used and positive paraxial power increases as the focal distance is shorter.

Further, the inventor of the present invention found that, since it is possible to realize an over-flare when the CD is used by a configuration of the present invention described above, excellent temperature property (change in a spherical aberration amount when the temperature changes) and wavelength property (change in the spherical aberration amount when the wavelength changes) when the DVD is used may also be realized and further, the excellent wavelength property when the BD is used may also be realized.

That is to say, according to the present invention, it is possible to improve a degree of freedom in design of the objective lens such that the objective lens is compatible with three types of different optical discs and is capable of appropriately forming a light convergeing spot for the third optical disc by flaring the third light flux, which passes through the intermediate region, and also capable of ensuring balance between the temperature property and the wavelength property by using the base structures of 1/1/1 and 2/1/1 in a superimposed manner in the central region and the intermediate region. It is possible to inhibit a discontinuous spherical aberration when the temperature and the wavelength of the light source changed and it becomes possible to inhibit occurrence of a high-order spherical aberration by using the base structures of the same order of diffraction of 1/1/1 and 2/1/1 in both of the central region and the intermediate region. Further, it is not required to superimpose the diffraction structure and the like to flare the third light flux on the intermediate region, so that forming becomes easy and ease of manufacture is improved, and as a result, the light use efficiency may be improved.

The objective lens according to claim 2 of the invention satisfies a following equation when a width of an annular zone of the second base structure closest to the boundary is represented by ΔT2 and a width of an annular zone of the fourth base structure closest to the boundary is represented by ΔT4 and when a width of the annular zone of each of the first base structure, the second base structure, the third base structure, and the fourth base structure is with the positive sign in a case in which the step of the base structure faces opposite to the optical axis and with the negative sign in a case in which the step of the base structure faces to the optical axis, in the present invention of claims 1.

$$\Delta T4 - \Delta T2 < 0 \qquad (2)$$

When a condition in claim 1 of the invention is satisfied, and further, when a difference between the pitch of the second base structure on the central region side and the pitch of the fourth base structure on the intermediate region side across the boundary between the central region and the intermediate region is large and the annular zone of each of the second base structure and the fourth base structure on both sides of the boundary has an ideal shape, the difference between the pitches is represented as a difference in annular zone width. (Herein, the ideal shape is intended to mean the shape in which a phase difference between a starting position and an ending position of one annular zone is an integral multiple of $2\pi$ or a value near the same. However, in a case of the shape obtained by superimposing plural diffraction structures, since a forming process becomes difficult in general when a difference between step positions of the diffraction structures is slight, the design is changed such that one step position conforms to the other, or the design is changed to set one step position in intermediate position between the other step positions, so that there is a case in which the ideal shape cannot be obtained.) In this manner, when the difference between the pitches is represented as the difference in the annular zone width, the above-described equation (2) is satisfied. In other words, although the equation (1) is always satisfied when the equation (2) is satisfied, there is a case in which the equation (2) is not satisfied even when the equation (1) is satisfied.

The equation (2) is hereinafter described in more detail.

A combination of a size relationship between the width ΔT2 of the annular zone of the second base structure closest to the boundary on the central region side and the width ΔT4 of the annular zone of the fourth base structure closest to the boundary on the intermediate region side and the relationship of the direction of the step, which generates the over-spherical aberration when the CD is used, will be described. FIGS. 1A, 1B, and 1C are schematic diagrams of a cross-sectional surface in the optical axis direction of the second base structure and the fourth base structure. Herein, the second base structure and the fourth base structure are referred to as the (2/1/1) diffraction structures for convenience. The boundary between the central region and the intermediate region is represented by BN, the width of the annular zone of the second base structure closest to the boundary is represented by |ΔT2|, and the width of the annular zone of the fourth base structure closest to the boundary is represented by |ΔT4|. Further, the sign of the pitch is negative (−) when the step of the base structure faces in the direction of the optical axis (lower side in FIGS. 1A, 1B, and 1C) and the sign of the pitch is positive (+) when the step of the base structure faces in the direction opposite to the optical axis (upper side in FIGS. 1A, 1B, and 1C).

The inventor of the present invention studied the combination of the size relationship between the width ΔT2 of the annular zone of the second base structure closest to the boundary on the central region side and the width ΔT4 of the annular zone of the fourth base structure closest to the boundary on the intermediate region side and the relationship of the direction of the step while dividing the focal distance f1 of the objective lens in the first light flux into predetermined ranges. FIG. 1A illustrates the combination of the size relationship between the width ΔT2 of the annular zone of the second base structure closest to the boundary on the central region side and the width ΔT4 of the annular zone of the fourth base structure closest to the boundary on the intermediate region side and the relationship of the direction of the step, which might generate the over-spherical aberration when the CD is used in a case in which the focal distance f1 is very short as 1.0 to 1.8 mm. More specifically, in the (2/1/1) diffraction structure illustrated in FIG. 1A, |ΔT2|>|ΔT4| is satisfied and the sign of the pitch is positive. Therefore, [the width ΔT4 of the annular zone of the fourth base structure closest to the boundary of the intermediate region including the sign]−[the width ΔT2 of the annular zone of the second base structure closest to the boundary of the central region including the sign] in the (2/1/1) diffraction structure=ΔT4−ΔT2<0 is satisfied. That is to say, the equation (2) is satisfied. Meanwhile, the equation (1) is also satisfied.

FIG. 1B illustrates the combination of the size relationship between the width ΔT2 of the annular zone of the second base structure closest to the boundary on the central region side and the width ΔT4 of the annular zone of the fourth base structure closest to the boundary on the intermediate region side and the relationship of the direction of the step, which might generate the over-spherical aberration when the CD is used, in a case in which the focal distance f1 of the objective lens in the first light flux is relatively short as 1.2 to 2.5 mm. More specifically, in the (2/1/1) diffraction structure illustrated in FIG. 1B, |ΔT2|<|ΔT4| is satisfied and the sign of the pitch is negative. Therefore, [the width ΔT4 of the annular zone of the fourth base structure closest to the boundary of the intermediate region including the sign]−[the width ΔT2 of the annular zone of the second base structure closest to the boundary of the central region including the sign] in the (2/1/1) diffraction structure=(−|ΔT4|)−(−|ΔT2|)<0 is satisfied. That is to say, the equation (2) is satisfied. The equation (1) is also satisfied.

FIG. 1C illustrates the combination of the size relationship between the width ΔT2 of the annular zone of the second base structure closest to the boundary on the central region side and the width ΔT4 of the annular zone of the fourth base structure closest to the boundary on the intermediate region side and the relationship of the direction of the step, which might generate the over-spherical aberration when the CD is used, in a case in which the focal distance f1 of the objective lens in the first light flux is relatively long as 2.0 to 3.5 mm. More specifically, in the (2/1/1) diffraction structure illustrated in FIG. 1C, |ΔT2|<|ΔT4| is satisfied and the sign of the pitch is negative. Therefore, [the width ΔT4 of the annular zone of the fourth base structure closest to the boundary of the intermediate region including the sign]−[the width ΔT2 of the annular zone of the second base structure closest to the boundary of the central region including the sign] in the (2/1/1) diffraction structure=(−|ΔT4|)−(−|ΔT2|)<0 is satisfied. That is to say, the equation (2) is satisfied. The equation (1) is also satisfied. That is to say, it is understood that it is possible to generate the over-spherical aberration when the CD is used when the equation (2) is satisfied regardless of the length of the focal distance f1.

The sign of the width ΔT of the annular zone closest to the boundary (the pitch P, too) changes according to the focal distance in this manner; this is because the paraxial power of the 2/1/1 structure is utilized for ensuring the working distance when the CD is used and the positive paraxial power increases as the focal distance is shorter.

When the equation (2) is satisfied, diffraction power by the second base structure and that by the fourth base structure are greatly different from each other, so that the flare on the information recording surface of the CD may be especially created.

According to the objective lens of claim 3 of the invention, a step of the second base structure in a position closest to the boundary faces to the optical axis, in the present invention of claim 1.

According to the objective lens of claim 4 of the invention, a step of the second base structure in a position closest to the boundary and a step of the fourth base structure in a position closest to the boundary face to a same direction, in the present invention of claim 1.

According to the objective lens of claim 5 of the invention, a pitch P1 of the first base structure in a position closest to the boundary and a pitch P3 of the third base structure in a position closest to the boundary across the boundary between the central region and the intermediate region satisfy a following equation (3) in consideration of the sign thereof, in the present invention of claim 1.

$$P3-P1<0 \tag{3}$$

According to the present invention, when the third optical disc is used, the flare is created by changing the diffraction power of each of the superimposed structures, so that individual power change amount may be made small. That is to say, when the over-flare is created when the third optical disc is used, the flare is created by changing not only the power of the 2/1/1 structure but also the power of a 1/1/1 structure, so that it becomes possible to create the over-flare when the third optical disc is used by making a power change amount of each of the 2/1/1/ structure and the 1/1/1 structure small. Therefore, a discontinuous amount of the aberration is small when the wavelength and the temperature changed, and the occurrence of the high-order aberration may be inhibited.

When the BD/DVD/CD compatibility in the central region is realized by summing (a) the over-spherical aberration generated on the parent aspherical surface of the objective lens, which is the convex lens, (b) the under-spherical aberration of the first base structure of the central region and the third base structure of the intermediate region, and (c) the under-spherical aberration of the second base structure of the central region and the fourth base structure of the intermediate region, since the pitch P2 of the second base structure in the position closest to the boundary and the pitch P4 of the fourth base structure in the position closest to the boundary across the boundary between the central region and the intermediate region satisfy P4−P2<0 and further P3−P1<0 is satisfied, the power of the intermediate region becomes further smaller than the power in the vicinity of the boundary of the central region in the vicinity of the boundary of the central region and the intermediate region, so that the spherical aberration correcting effect is smaller in the vicinity of the boundary of the intermediate region than in the vicinity of the boundary of the central region (spherical aberrations of (b) and (c) are small). Therefore, the over-spherical aberration of (a) remains much in the vicinity of the boundary of the intermediate region and it becomes possible to create the flare farther when the CD is used.

This relationship is hereinafter described, from a viewpoint similar to that of the second aspect of the invention, based on a case in which the difference between the pitch of the first base structure on the central region side and the pitch of the third base structure on the intermediate region side across the boundary between the central region and the intermediate region is large and the annular zone of each of the first base structure and the third base structure on the both sides of the boundary has the ideal shape, and the difference between the pitches is represented as the difference in the annular zone width.

FIGS. 2A, 2B, and 2C are schematic diagrams of a cross-sectional surface in the optical axis direction of the first base structure and the third base structure. Herein, the first base structure and the third base structure are referred to as the (1/1/1) diffraction structures for convenience. The boundary between the central region and the intermediate region is represented by BN, a width of the annular zone of the first base structure closest to the boundary is represented by |ΔT1| and a width of the annular zone of the third base structure closest to the boundary is represented by |ΔT3|. Further, the sign of the pitch is negative (−) when the step of the base structure faces in the direction of the optical axis (lower side in FIGS. 2A, 2B, and 2C) and the sign of the pitch is positive (+) when the step of the base structure faces in the direction opposite to the optical axis (upper side in FIGS. 2A, 2B, and 2C).

The inventor of the present invention studied the combination of the size relationship between the width ΔT1 of the annular zone of the first base structure closest to the boundary on the central region side and the width ΔT3 of the annular zone of the third base structure closest to the boundary on the intermediate region side and the relationship of the direction of the step while dividing the focal distance f1 of the objective lens in the first light flux into predetermined ranges. FIG. 2A illustrates the combination of the size relationship between the width ΔT1 of the annular zone of the first base structure closest to the boundary on the central region side and the width ΔT3 of the annular zone of the third base structure closest to the boundary on the intermediate region side and the relationship of the direction of the step, which might generate the over-spherical aberration when the CD is used in cooperation with the relationship represented by the equation (1) or (2), in a case in which the focal distance f1 is very short as 1.0 to 1.8 mm. More specifically, in the (1/1/1) diffraction structure illustrated in FIG. 2A, |ΔT1|>|ΔT3| is satisfied and the sign of the pitch is positive. Therefore, [the width ΔT3 of the annular zone of the third base structure closest to the boundary of the intermediate region including the sign]−[the width ΔT1 of the annular zone of the first base structure closest to the boundary of the central region including the sign] in the (1/1/1) diffraction structure=ΔT3−ΔT1<0 is satisfied. Meanwhile, the equation (3) is also satisfied.

FIG. 2B illustrates the combination of the size relationship between the width ΔT1 of the annular zone of the first base structure closest to the boundary on the central region side and the width ΔT3 of the annular zone of the third base structure closest to the boundary on the intermediate region side and the relationship of the direction of the step, which might generate the over-spherical aberration when the CD is used in cooperation with the relationship represented by the equation (1) or (2), in a case in which the focal distance f1 of the objective lens in the first light flux is relatively short as 1.2 to 2.5 mm. More specifically, in the (1/1/1) diffraction structure illustrated in FIG. 2B, |ΔT1|>|ΔT3| is satisfied and the sign of the pitch is positive. Therefore, [the width ΔT3 of the annular zone of the third base structure closest to the boundary of the intermediate region including the sign]−[the width ΔT1 of the annular zone of the first base structure closest to the boundary of the central region including the sign] in the (1/1/1) diffraction structure=ΔT3−ΔT1<0 is satisfied. The equation (3) is also satisfied.

FIG. 2C illustrates the combination of the size relationship between the width ΔT1 of the annular zone of the first base structure closest to the boundary on the central region side and the width ΔT3 of the annular zone of the third base structure closest to the boundary on the intermediate region side and the relationship of the direction of the step, which might generate the over-spherical aberration when the CD is used in cooperation with the relationship represented by the equation (1) or (2), in a case in which the focal distance f1 of the objective lens in the first light flux is relatively long as 2.0 to 3.5 mm. More specifically, in the (1/1/1) diffraction structure illustrated in FIG. 2C, |ΔT1|<|ΔT3| is satisfied and the sign of the pitch is negative. Therefore, [the width ΔT3 of the annular zone of the third base structure closest to the boundary of the intermediate region including the sign]−[the width ΔT1 of the annular zone of the first base structure closest to the boundary of the central region including the sign] in the (1/1/1) diffraction structure=(−|ΔT3|)−(−|ΔT1|)<0 is satisfied. The equation (3) is also satisfied. That is to say, it is understood that it is possible to generate the over-spherical aberration when the CD is used in cooperation with the relationship represented by the equation (1) or (2) when the above-described relationship is satisfied regardless of the length of the focal distance f1.

The sign of the width ΔT of the annular zone closest to the boundary (the pitch P, too) changes according to the focal distance in this manner; this is because paraxial power of the 1/1/1 structure is utilized for ensuring the working distance when the CD is used and the positive paraxial power increases as the focal distance is shorter.

According to the objective lens of claim 6 of the invention, a pitch P1 of the first base structure in a position closest to the boundary, a pitch P3 of the third base structure in a position closest to the boundary, a pitch P2 of the second base structure in a position closest to the boundary, and a pitch P4 of the fourth base structure in a position closest to the boundary satisfy a following equation (4) in consideration of the sign thereof, in the present invention of claim 1.

$$|P3-P1|<|P4-P2| \quad (4)$$

Since the (1/1/1) diffraction structure usually has the diffraction power for ensuring the working distance of the third optical disc in general, the pitch is finer in general, so that it becomes possible to create the flare when the third optical disc is used without deterioration in formability by principally utilizing diffraction power change of the (2/1/1) diffraction structure having a larger pitch.

According to the objective lens of claim 7 of the invention, the third light flux, which passes through the second optical path difference providing structure, generates an over-spherical aberration on the information recording surface of the third optical disc, in the present invention of claim 1.

In this manner, it is possible to generate the over-spherical aberration on the information recording surface of the third optical disc by using the same base structures in the central region and the intermediate region in a superimposed manner, so that the spherical aberration when the wavelength changed becomes small when the first optical disc and the second optical disc are used. Also, the aberration due to the change in wavelength is small and the aberration caused by change in refractive index by the temperature is smaller in the second optical disc than in the first optical disc, so that the spherical aberration when the temperature changed may be made small when the second optical disc is used. Therefore, a separate spherical aberration correction structure is not necessary especially in the second optical disc, so that the ease of manufacture of the objective lens and the optical pickup device is improved.

Herein, "the over-spherical aberration is generated on the information recording surface of the third optical disc" is intended to mean that the third light flux, which passed through the second optical path difference providing structure, has the aberration on an over side as illustrated in a longitudinal spherical aberration diagram in FIG. 3A. Meanwhile, FIG. 3B illustrates the under-spherical aberration.

According to the objective lens of claim 8 of the invention, steps closest to the boundary of the first base structure and the third base structure face in the direction of the optical axis, steps closest to the boundary of the second base structure and the fourth base structure face in the direction of the optical axis, a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (5) and (6) in consideration of the sign thereof, in the present invention of claim 1.

$$P3 < P1 < 0 \quad (5)$$

$$P4 < P2 < 0 \quad (6)$$

A case in which the equations (5) and (6) are satisfied is a case illustrated in FIG. 1C, 2C or the like.

The objective lens according to claim 9 of the invention satisfies a following equation (7) when a focal distance of the objective lens in the first light flux is represented by f1 (mm), in the present invention of claim 8.

$$2.0 \leq f1 \leq 3.5 \quad (7)$$

According to the objective lens of claim 10 of the invention, steps of the first base structure and the third base structure closest to the boundary face opposite to the optical axis, the steps of the second base structure and the fourth base structure closest to the boundary face to the optical axis, a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (8) and (9) in consideration of the sign thereof, in the present invention of claim 1.

$$P1 > P3 > 0 \quad (8)$$

$$P4 < P2 < 0 \quad (9)$$

A case in which the equations (8) and (9) are satisfied is a case illustrated in FIG. 1B, 2B or the like. By superimposing the first base structure and the third base structure such that the direction of the steps thereof differs from the direction of the steps of the second base structure and the fourth base structure, it becomes possible to limit the height of the step after they are superimposed as compared to a case in which they are superimposed such that the direction of the steps of the first base structure and the third base structure and that of the second base structure and the fourth base structure are the same, and according to this, light amount loss due to the manufacturing error may be inhibited and it becomes possible to inhibit a fluctuation in the diffraction efficiency during fluctuation in wavelength.

The objective lens according to claim 11 of the invention satisfies a following equation (10) when a focal distance of the objective lens in the first light flux is represented by f1 (mm), in the present invention of claim 10.

$$1.5 \leq f1 \leq 2.5 \quad (10)$$

According to the objective lens of claim 12 of the invention, steps of the first base structure and the third base structure closest to the boundary face opposite to the optical axis, steps of the second base structure and the fourth base structure closest to the boundary face opposite to the optical axis, and a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (11) and (12) in consideration of the sign thereof, in the present invention of claim 1.

$$P1 > P3 > 0 \quad (11)$$

$$P2 < P4 < 0 \quad (12)$$

A case in which the equations (11) and (12) are satisfied is a case illustrated in FIG. 1A, 2A or the like.

The objective lens according to claim 13 of the invention satisfies a following equation (13) when a focal distance of the objective lens in the first light flux is represented by f1 (mm), in the present invention of claim 12.

$$1.0 \leq f1 \leq 1.8 \quad (13)$$

The objective lens according to claim 14 of the invention satisfies a following equation (14) when paraxial power of the first base structure in the third light flux is represented by PW1, paraxial power of the second base structure in the third light flux is represented by PW2, paraxial power of the third base structure in the third light flux is represented by PW3, and paraxial power of the fourth base structure in the third light flux is represented by PW4, in the present invention of claim 1.

$$0 < (PW1/PW3)/(PW2/PW4) < 0.9 \quad (14)$$

Although the flare is created when the third optical disc is used by making the power of the diffraction structure of a common region different from that of the intermediate region, the spherical aberration is discontinuous within an effective diameter of the first optical disc and the second optical disc only by the same. Therefore, it is desirable to create the flare by changing the paraxial power such that the continuous spherical aberration is realized.

Herein, when the paraxial power is used in place of the power, it is possible to change the power of the third light flux by making a value of (PW1/PW3) and a value of (PW2/PW4) different (that is to say, (PW1/PW3)/(PW2/PW4) is kept away from 1.0), so that the flare can be created when the third optical disc is used. More specifically, when the equation (14) is satisfied, the longitudinal spherical aberration diagram when the CD is used indicates "over" outside of a numerical aperture as illustrated in FIG. 3A. According to this, excellent aperture control when the third optical disc is used can be performed.

The objective lens according to claim 15 of the invention satisfies a following equation (14'), in the present invention of claim 14.

$$0.65 \leq (PW1/PW3)/(PW2/PW4) < 0.9 \quad (14')$$

When a value of the equation (14') is not lower than a lower limit, the wavelength property when the first optical disc and the second optical disc are used is made excellent and the temperature property when the second optical disc is used is made excellent, on the other hand, when the value of the equation (14') is lower than a higher limit, it is possible to create the flare when the third optical disc is used in a position sufficiently away from a light focusing spot.

The objective lens according to an aspect of the invention satisfies a following equation (15).

$$0.8 \leq d/f1 \leq 1.5 \quad (15)$$

Where d represents a thickness (mm) of the objective lens on the optical axis and f1 represents the focal distance (mm) of the objective lens in the first light flux.

The objective lens with a smaller diameter is required with downsizing of the optical pickup device. When the objective lens is compatible with a short-wavelength and high-NA optical disc such as the BD, although there is a problem that astigmatism tends to easily occur and an eccentric coma aberration tends to easily occur therein, it becomes possible to inhibit occurrence of the astigmatism and the eccentric coma aberration when the condition equation (15) is satisfied. The smaller a diameter of the objective lens is, the smaller the pitch of the base structure is, and the forming becomes more difficult; however, when a value of the equation (15) is not lower than a lower limit, the pitch of the base structure does not become too small and the ease of manufacture of the objective lens increases.

According to the objective lens of an aspect of the invention, the central region has only the first optical path difference providing structure obtained by superimposing only the first base structure and the second base structure on each other and the intermediate region has only the second optical path difference providing structure obtained by superimposing only the third base structure and the fourth base structure on each other.

According to the structure, the objective lens having the optical path difference providing structure with a simple shape, a relatively small step, and improved ease of manufacture can be provided. Therefore, it is possible to make the fluctuation in the diffraction efficiency smaller even when the wavelength changed and the temperature changed, and further, it is possible to inhibit the deterioration in the light use efficiency due to the manufacturing error and the shadow effect.

The objective lens according to an aspect of the invention satisfies following equations (16) to (18) when magnification of the objective lens in the first light flux is represented by m1, magnification of the objective lens in the second light flux is represented by m2, and magnification of the objective lens in the third light flux is represented by m3.

$$-0.003 \leq m1 \leq 0.003 \quad (16)$$

$$-0.003 \leq m2 \leq 0.003 \quad (17)$$

$$-0.003 \leq m3 \leq 0.003 \quad (18)$$

The objective lens according to an aspect of the invention satisfies following equations (19) to (21) when the magnification of the objective lens in the first light flux is represented by m1, the magnification of the objective lens in the second light flux is represented by m2, and the magnification of the objective lens in the third light flux is represented by m3.

$$-0.003 \leq m1 \leq 0.003 \quad (19)$$

$$-0.03 \leq m2 < -0.003 \quad (20)$$

$$-0.03 \leq m3 < -0.003 \quad (21)$$

When the equations (19) to (21) are satisfied, it becomes possible to ensure a long working distance in the third optical disc, and according to this, the annular zone width of the objective lens may be made wider and the objective lens with the high light use efficiency, which may be easily manufactured, can be obtained.

An objective lens according to claim 16 of the invention is an objective lens used in an optical pickup device including a first light source which emits a first light flux at a first wavelength $\lambda 1$ (nm), a second light source which emits a second light flux at a second wavelength $\lambda 2$ (nm) ($\lambda 2 > \lambda 1$), and a third light source which emits a third light flux at a third wavelength $\lambda 3$ (nm) ($\lambda 3 > \lambda 2$). The objective lens is used for recording and/or reproducing information of a first optical disc including a protective substrate with a thickness of t1 by using the first light flux, for recording and/or reproducing information of a second optical disc including a protective substrate with a thickness of t2 (t1<t2) by using the second light flux, and for recording and/or reproducing information of a third optical disc including a protective substrate with a thickness of t3 (t2<t3) by using the third light flux. Here, the objective lens is a single lens, an optical surface of the objective lens at least includes a central region, an intermediate region around the central region, and a peripheral region around the intermediate region, the objective lens converges the first light flux, which passes through the central region, on an information recording surface of the first optical disc such that the information may be recorded and/or reproduced, converges the second light flux, which passes through the central region, on an information recording surface of the second optical disc such that the information may be recorded and/or reproduced, and converges the third light flux, which passes through the central region, on an information recording surface of the third optical disc such that the information may be recorded and/or reproduced, the objective lens converges the first light flux, which passes through the intermediate region, on the information recording surface of the first optical disc such that the information may be recorded and/or reproduced, converges the second light flux, which passes through the intermediate region, on the information recording surface of the second optical disc such that the information may be recorded and/or reproduced, and does not converge the third light flux, which passes through the intermediate region, on the information recording surface of the third optical disc such that the information may be recorded and/or reproduced, the objective lens converges the first light flux, which passes through the peripheral region, on the information recording surface of the first optical disc such that the information may be recorded and/or reproduced, does not converge the second light flux, which passes through the peripheral region, on the information recording surface of the second optical disc such that the information may be recorded and/or reproduced, and does not converge the third light flux, which passes through the peripheral region, on the information recording surface of the third optical disc such that the information may be recorded and/or reproduced, the central region includes a first optical path difference providing structure obtained by superimposing a first base structure, which is a blazed structure, and a second base structure, which is the blazed structure, on each other, the intermediate region includes a second optical path difference providing structure obtained by superimposing a third base structure, which is the blazed structure, and a fourth base structure, which is the blazed structure, on each other, the first base structure makes an amount of A-th order diffracted light of the first light flux, which passes through the first base structure, larger than an amount of diffracted light of any other order, makes an amount of B-th order diffracted light of the second light flux, which passes through the first base structure, larger than the amount of the diffracted light of any other order, and makes an amount of C-th order diffracted light of the third light flux, which passes through the first base structure, larger than the amount of the diffracted light of any other order, the second base structure makes an amount of D-th order diffracted light of the first light flux, which passes through the second base structure, larger than the amount of the diffracted light of any other order, makes an amount of E-th order diffracted light of the second light flux, which passes through the second base structure, larger than the amount of the diffracted light of any other order, and makes an amount of F-th order diffracted light of the third light flux, which passes through the second base structure, larger than the amount of the diffracted light of any other order, the third base structure makes an amount of A-th order diffracted light of the first light flux, which passes through the third base structure, larger than the amount of the diffracted light of any other order, makes an amount of B-th order diffracted light of the second light flux, which passes through the third base structure, larger than the amount of the diffracted light of any other order, and makes an amount of C-th order diffracted light of the third light flux, which passes through the third base structure, larger than the amount of the diffracted light of any other order, the fourth base structure makes an amount of D-th order diffracted light of the first light flux, which passes through the fourth base structure, larger than the amount of the diffracted light of any other order, makes an amount of E-th order diffracted light of the second light flux, which passes through the fourth base structure, larger than the amount of the diffracted light of any other order, and makes an amount of F-th order diffracted light of the third light flux, which passes through the fourth base structure, larger than the amount of the diffracted light of any other order, A, B, C, D, E, and F satisfy
$|A|=1$,
$|B|=1$,
$|C|=1$,
$|D|=2$,
$|E|=1$, and
$|F|=1$, respectively, and a width of an annular zone of the second base structure closest to the boundary is represented by $\Delta T2$ and a width of the annular zone of the fourth base structure closest to the boundary is represented by $\Delta T4$, and a width of an annular zone of each of the first base structure, the second base structure, the third base structure, and the fourth base structure is with a positive sign when a step of the base structure faces opposite to an optical axis and is with a negative sign when the step of the base structure faces to the optical axis, a following equation is satisfied.

$$\Delta T4 - \Delta T2 < 0 \qquad (2)$$

According to the objective lens of claim 17 of the invention, a step of the second base structure in a position closest to the boundary faces to the optical axis, in the present invention of claim 16.

According to the objective lens of claim 18 of the invention, a step of the second base structure in a position closest to the boundary and a step of the fourth base structure in a position closest to the boundary face to a same direction, in the present invention of claim 16.

An optical pickup device according to claim 19 of the invention includes the objective lens according to claim 1.

The optical pickup device according to claim 20 of the invention includes a coupling lens through which at least the first light flux and the second light flux pass, and an actuator, which moves the coupling lens in a direction of an optical axis, in which the coupling lens is arranged to be movable in the direction of the optical axis by the actuator when the first light flux passes, and a position of the coupling lens in the direction of the optical axis is fixed when the second light flux passes, in the present invention of claim 19.

For example, in order to adapt the first optical disc including a plurality of information recording layers, it is considered to displace the coupling lens in the optical axis direction and allows the coupling lens to adapt recording/reproduction on/from each information recording layer when the first optical disc is used. In such a case, although a function to displace the coupling lens in the optical axis direction is already indispensable, there is a case in which it is favorable that the coupling lens is not displaced in the optical axis direction but fixed when the second optical disc is used. This is because, although the flare is not generated when the first optical disc is used, the flare is generated when the second optical disc is used, so that the aberration of the flare changes by displacement of the coupling lens and the flare might eventually adversely affect the recording/reproduction, because an initial position of the coupling lens is wanted to be always constant so as to distinguish a type of the second optical disc, or simply because a firmware cost for displacing the coupling lens is wanted to be reduced if only a little in a drive unit. By using the objective lens of the present invention for such a problem, since the third light flux, which passes through the second optical path difference providing structure, has the aberration on the over side, the temperature property and the wavelength property when the second optical disc is used can be made excellent, and as a result, when the second optical disc is used, it becomes possible to record/reproduce the information on/from the information recording surface of the second optical disc even in a state in which the position of the coupling lens in the optical axis direction is fixed when the second light flux passes, therefore, the above-described problem was solved.

The optical pickup device according to the present invention includes at least three light sources, which are the first light source, the second light source, and the third light source. Further, the optical pickup device of the present invention includes a light converging optical system for converging the first light flux on the information recording surface of the first optical disc, converging the second light flux on the information recording surface of the second optical disc, and converging the third light flux on the information recording surface of the third optical disc. Also, the optical pickup device of the present invention includes a photo-receiving element, which receives a reflected light flux from the information recording surfaces of the first optical disc, the second optical disc, or the third optical disc.

The first optical disc includes the protective substrate with the thickness of t1 and the information recording surface. The second optical disc includes the protective substrate with the thickness of t2 (t1<t2) and the information recording surface. The third optical disc includes the protective substrate with the thickness of t3 (t2<t3) and the information recording surface. The first optical disc is preferably the BD, the second optical disc is preferably the DVD, and the third optical disc is preferably the CD, but the discs are not limited thereto.

Meanwhile, the first optical disc, the second optical disc, or the third optical disc may be multi-layer optical discs including a plurality of information recording surfaces.

In this description, the BD is a collective term for BD-series optical discs, of which the protective substrate has a thickness of approximately 0.05 to 0.125 mm, on/from which information is recorded/reproduced by the light flux at a wavelength of approximately 390 to 415 mm and the objective lens of which NA is approximately 0.8 to 0.9, and includes the BD including only a single information recording layer and the BD including two or more information recording layers. Further, in this description, the DVD is a collective term for DVD-series optical discs, of which the protective substrate has a thickness of approximately 0.6 mm, on/from which information is recorded/reproduced by the objective lens of which NA is approximately 0.60 to 0.67, and includes a DVD-ROM, a DVD-Video, a DVD-Audio, a DVD-RAM, a DVD-R, a DVD-RW, a DVD+R, a DVD+RW and the like. Also, in this description, the CD is a collective term for CD-series optical discs, of which the protective substrate has a thickness of approximately 1.2 mm, on/from which information is recorded/reproduced by the objective lens of which NA is approximately 0.45 to 0.51, and includes a CD-ROM, a CD-Audio, a CD-Video, a CD-R, a CD-RW and the like. As for recording density, the recording density of the BD is the highest, that of the DVD is the second highest, and that of the CD is lower than them.

Although the thicknesses t1, t2, and t3 of the protective substrates preferably satisfy following condition equations (22), (23), and (24), respectively, the thicknesses are not limited thereto. The thickness of the protective substrate is herein intended to mean the thickness of the protective substrate provided on an optical disc surface. That is to say, this is intended to mean the thickness of the protective substrate from the optical disc surface to the information recording surface closest to the surface.

$$0.050 \text{ mm} \leq t1 \leq 0.125 \text{ mm} \quad (22)$$

$$0.5 \text{ mm} \leq t2 \leq 0.7 \text{ mm} \quad (23)$$

$$1.0 \text{ mm} \leq t3 \leq 1.3 \text{ mm} \quad (24)$$

In this description, the first light source, the second light source, and the third light source are preferably laser light sources. A semiconductor laser, a silicon laser and the like may be preferably used as the laser light source. The first wavelength $\lambda 1$ of the first light flux emitted from the first light source, the second wavelength $\lambda 2$ ($\lambda 2 > \lambda 1$) of the second light flux emitted from the second light source, and the third wavelength $\lambda 3$ ($\lambda 3 > \lambda 2$) of the third light flux emitted from the third light source preferably satisfy following condition equations (25) and (26).

$$1.5 \cdot \lambda 1 < \lambda 2 < 1.7 \cdot \lambda 1 \quad (25)$$

$$1.8 \cdot \lambda 1 < \lambda 3 < 2.0 \cdot \lambda 1 \quad (26)$$

When the BD, the DVD, and the CD are used as the first optical disc, the second optical disc, and the third optical disc, respectively, the first wavelength $\lambda 1$ of the first light source is preferably not shorter than 350 nm and not longer than 440 nm and more preferably not shorter than 390 nm and not longer than 415 nm, the second wavelength $\lambda 2$ of the second light source is preferably not shorter than 570 nm and not longer than 680 nm and more preferably not shorter than 630 nm and not longer than 670 nm, and the third wavelength $\lambda 3$ of the third light source is preferably not shorter than 750 nm and not longer than 880 nm and more preferably not shorter than 760 nm and not longer than 820 nm.

Meanwhile, although there is a risk of occurrence of cross-talk and the like when the laser light source is of a type to perform high-frequency superposition, an axial chromatic aberration is preferably set to 0.9 µm/nm or smaller, thereby preventing the occurrence of the cross-talk and the like even with the laser light source, which performs such high-frequency superposition. Although a problem such as the cross-talk becomes larger when the laser light source in which a full width at half maximum of a wavelength spectrum of the emitted light flux (full width of the wavelength spectrum at a half value of a peak value) is not shorter than 0.5 nm (preferably, all the three light sources with different wavelengths) are used, this is preferably used without problem by setting the axial chromatic aberration to 0.9 µm/nm or lower.

It is also possible to make at least two light sources out of the first light source, the second light source, and the third light source a unit. A unit is intended to mean the first light source and the second light source fixedly stored in one package, for example. It is also possible to make one package of the photo-receiving element to be described later in addition to the light source.

A photo detector such as a photo diode is preferably used as the photo-receiving element. The light reflected on the information recording surface of the optical disc enters the photo-receiving element and a reading signal of the information recorded on each optical disc is obtained by using an output signal thereof. Further, it is possible to detect change in light amount by change in shape and change in position of the spot on the photo-receiving element to detect focusing and tracking and to move the objective lens for focusing and tracking based on the detection. The photo-receiving element may be formed of a plurality of photo detectors. The photo-receiving element may include a main photo detector and a sub photo detector. For example, the photo-receiving element may be such that two sub photo detectors are provided on both sides of the photo detector, which receives main light used for recording and reproducing the information, and sub light for tracking adjustment is received by the two sub photo detectors. The photo-receiving element may also include a plurality of photo-receiving elements corresponding to each light source.

The light converging optical system includes the objective lens. The light converging optical system preferably includes the coupling lens such as a collimator in addition to the objective lens. The coupling lens is intended to mean a single lens or a lens group arranged between the objective lens and the light source to change a divergence angle of the light flux. The collimator is a type of the coupling lens, which makes light entering the collimator parallel light to emit. In this description, the objective lens is intended to mean an optical system arranged in a position opposed to the optical disc in the optical pickup device having a function to converge the light flux emitted from the light source on the information recording surface of the optical disc. Although the objective lens may be formed of two or more lenses and/or optical elements or formed only of the single lens, this is preferably the objective lens formed of a single convex lens. Also, the objective lens may be a glass lens, a plastic lens, or a hybrid lens provided with the optical path difference providing structure made of a photo-curable resin, a LTV-curable resin, or a thermal-curable (thermosetting) resin on the glass lens. When the objective lens includes a plurality of lens, it is also possible to use the glass lens and the plastic lens together. When the objective lens includes a plurality of lens, a combination of a flat optical element including the optical path difference providing structure and an aspherical lens (with or without the optical path difference providing structure) may be available. A refractive surface of the objective lens is preferably an aspherical surface. A base surface on which the optical path difference providing structure is provided of the objective lens is preferably an aspherical surface.

When the objective lens is the glass lens, a glass material of which glass-transition point Tg is not higher than 500° C. and more preferably not higher than 400° C. is preferably used. Forming at a relatively low temperature becomes possible by using the glass material of which glass-transition point Tg is not higher than 500° C., so that a lifetime of a mold may be prolonged. Such glass material of which glass-transition point Tg is low includes K-PG325 and K-PG375 (product names) of SUMITA OPTICAL GLASS, Inc. for example.

Since the glass lens generally has a larger specific gravity than the resin lens, when the glass lens is used as the objective lens, a weight becomes larger and a load is applied on an actuator, which drives the objective lens. Therefore, it is preferable to use the glass material of which specific gravity is small when using the glass lens as the objective lens. Specifically, the specific gravity not larger than 4.0 is preferable and the specific gravity not larger than 3.0 is more preferable.

In addition, one of important material values when the glass lens is formed to be manufactured is a linear expansion coefficient a. Even if the material of which Tg is not higher than 400° C. is selected, a temperature difference from a room temperature is still large as compared to that of a plastic material. When the lens is formed by using the glass material of which linear expansion coefficient a is large, breaking easily occurs when the temperature is lowered. The linear expansion coefficient a of the glass material is preferably not higher than 200 (10E-7/K) and more preferably not higher than 120.

When the objective lens is formed of the plastic lens, an alicyclic hydrocarbon polymer material such as a cyclic olefin resin material is preferably used. Also, the resin material of which refractive index at a temperature of 25° C. with respect to the wavelength of 405 nm is within a range from 1.54 to 1.60 and of which refractive index change rate dN/dT (° C.−1) with respect to the wavelength of 405 nm associated with the change in temperature within a temperature range from −5° C. to 70° C. is within a range from −20×10-5 to −5×10-5 (more preferably, from −10×10-5 to −8×10-5) is more preferably used as the resin material. It is also preferable to use the plastic lens as the coupling lens when the plastic lens is used as the objective lens.

Preferred examples of the alicyclic hydrocarbon polymer are hereinafter described.

A first preferred example is a resin composition containing a block copolymer having a polymer block [A] containing a repeating unit [1] represented by a following formula (I) and a polymer block [B] containing the repeating unit [1] represented by the following formula (I), a repeating unit [2] represented by a following formula (II), and/or a repeating unit [3] represented by a following formula (III) in which a relationship between a molar fraction a (mol %) of the repeating unit [1] in the block [A] and a molar fraction b (mol %) of the repeating unit [1] in the block [B] satisfies a>b.

[Chemical Formula 1]

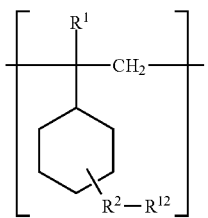

(I)

(where R1 represents a hydrogen atom or an alkyl group of 1 to 20 carbon atoms, and R2 to R12 independently represent a hydrogen atom, alkyl group of 1 to 20 carbon atoms, a hydroxyl group, an alkoxy group of 1 to 20 carbon atoms, or a halogen group, respectively.)

[Chemical Formula 2]

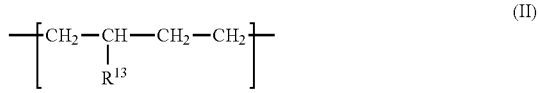

(II)

(where R13 represents a hydrogen atom or an alkyl group of 1 to 20 carbon atoms.)

[Chemical Formula 3]

(III)

(where R14 and R15 independently represent a hydrogen atom or an alkyl group of 1 to 20 carbon atoms.)

Next, a second preferred example is the resin composition containing a polymer (A) obtained by additive polymerization of at least an α-olefin having 2 to 20 carbon atoms and a monomer composition composed of a cyclic olefin represented by a following general expression (IV) and a polymer (B) obtained by additive polymerization of the α-olefin with having 2 to 20 carbon atoms and a monomer composition composed of the cyclic olefin represented by a following general expression (V).

[Chemical Formula 4]

General Expression (IV)

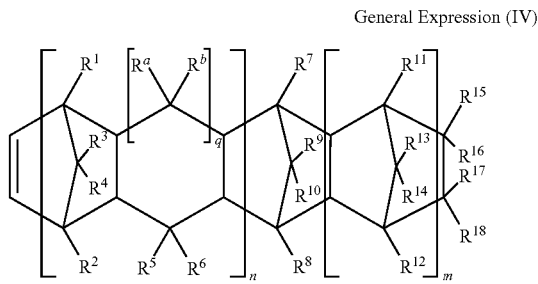

[where n is 0 or 1, m is 0 or an integer not smaller than 1, q is 0 or 1, R1 to R18, Ra and Rb independently represent a hydrogen atom, a halogen atom, or a hydrocarbon group where R15 to R18 may be bonded with each other to form a monocyclic ring or a polycyclic ring, the monocyclic ring or the polycyclic ring in brackets may have a double bond, or R15 and R16 or R17 and R18 may form an alkylidene group.]

[Chemical Formula 5]

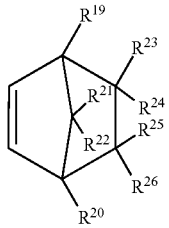

General Expression (V)

[where R19 to R26 independently represent a hydrogen atom, a halogen atom, or a hydrocarbon group.]

A following additive may be added for adding another performance to the resin material.

(Stabilizer)

At least one type of stabilizer selected from a phenol-based stabilizer, a hindered amine-based stabilizer, a phosphorus-based stabilizer, and a sulfur-based stabilizer is preferably added. It is possible to more highly inhibit an optical property fluctuation such as white turbidity and a fluctuation in refractive index when light at a short wavelength such as 405 nm is continuously applied, for example, by appropriately selecting to add such stabilizer.

As a preferable phenol-based stabilizer, a conventionally-known one including an acrylate compound disclosed in JP-A No. 63-179953 and JP-A No. 1-168643 such as 2-t-butyl-6-(3-t-butyl-2-hydroxy-5-methylbenzyl)-4-methylphenylacrylate and 2,4-di-t-amyl-6-(1-(3,5-di-t-amyl-2-hydroxyphenyl)ethyl)phenylacrylate; an alkyl-substituted phenol-based compound such as octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis(methylene-3-(3',5'-di-t-butyl-4'-hydroxyphenyl propionate))methane [that is to say, pentaerythrimethyl-tetrakis(3-(3,5-di-t-butyl-4-hydroxyphenyl propionate))], and triethylene glycol bis(3-(3-t-butyl-4-hydroxy-5-methylphenyl)propionate); and a triazine group-containing phenol-based compound such as 6-(4-hydroxy-3,5-di-t-butylanilino)-2,4-bisoctylthio-1,3,5-triazine, 4-bisoctylthio-1,3,5-triazine, and 2-octylthio-4,6-bis-(3,5-di-t-butyl-4-oxyanilino)-1,3,5-triazine; may be used, for example.

Also, a preferable hindered amine-based stabilizer includes bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl) sebacate, bis(1,2,2,6,6-pentamethyl-4-piperidyl)2-(3,5-di-t-butyl-4-hydroxybenzyl)-2-butylmalonate, bis(1-acroyl-2,2,6,6-tetramethyl-4-piperidyl)2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6, 6-tetramethyl-4-piperidyl) propionamide, tetrakis(2,2,6,6-tetramethyl-4-piperidyl)1,2,3,4-butane tetracarboxylate, tetrakis(1,2,2,6,6-pentamethyl-4-piperidyl)1,2,3,4-butane tetracarboxylate and the like.

Also, a preferable phosphorus-based stabilizer is not especially limited as long as this is normally used in a general resin industry, and there are a monophosphite compound such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl)phosphite, and 10-(3,5-di-t-butyl-4-hydroxybenzyl)-9,10-dihydro-9-oxa-10-phosphaphenanthrene-10-oxide; and a diphosphite compound such as 4-4'-butylidene-bis(3-methyl-6-t-butylphenyl-di-tridecylphosphite) and 4,4'-isopropylidene-bis(phenyl-di-alkyl(C12-C15)phosphite), for example. Among them, the monophosphite compound is preferable and tris(nonylphenyl)phosphite, tris(dinonylphenyl)phosphite, tris(2,4-di-t-butylphenyl)phosphite and the like are especially preferable.

Also, there are dilauryl 3,3-thiodipropionate, dimyristyl 3,3'-thiodipropionate, distearyl 3,3-thiodipropionate, laurylstearyl 3,3-thiodipropionate, pentaerythritol-tetrakis-(β-lauryl-thio)-propionate, 3,9-bis(2-dodecylthioethyl)-2,4,8,10-tetraoxaspiro[5,5] undecane and the like, for example, as a preferable sulfur-based stabilizer.

A blended amount of each stabilizer is appropriately selected from a range in which an object of the present invention is not damaged, and this is generally set to 0.01 to 2 parts by mass and preferably set to 0.01 to 1 part by mass with respect to 100 parts by mass of the alicyclic hydrocarbon copolymer.

(Surface Active Agent)

A surface active agent is a compound containing a hydrophilic group and a hydrophobic group in the same molecule. The surface active agent is capable of preventing the white turbidity of the resin composition by adjusting water adhesion on a surface of the resin and a speed of evaporation of water from the surface.

The hydrophilic group of the surface active agent specifically includes a hydroxy group, a hydroxyalkyl group with 1 or more carbon atoms, the hydroxyl group, a carbonyl group, an ester group, an amino group, an amid group, an ammonium salt, a thiol, a sulfonate, a phosphate, a polyalkylene glycol group and the like. Herein, the amino group may be any of primary, secondary, and tertiary amino groups. The hydrophobic group of the surface active agent specifically includes the alkyl group having 6 or more carbon atoms, a silyl group having an alkyl group having 6 or more carbon atoms, a fluoroalkyl group having 6 or more carbon atoms and the like. Herein, the alkyl group having 6 or more carbon atoms may have an aromatic ring as a substituent group. The alkyl group specifically includes hexyl, heptyl, octyl, nonyl, decyl, undecenyl, dodecyl, tridecyl, tetradecyl, myristyl, stearyl, lauryl, palmityl, cyclohexyl and the like. The aromatic ring includes a phenyl group and the like. The surface active agent may include at least one hydrophilic group and one hydrophobic group described above in the same molecule or this may include two or more of each group.

Such a surface active agent more specifically includes myristyl diethanolamine, 2-hydroxyethyl-2-hydroxydodecylamine, 2-hydroxyethyl-2-hydroxytridecylamine, 2-hydroxyethyl-2-hydroxytetradecylamine, pentaerythritol monostearate, pentaerythritol distearate, pentaerythritol tristearate, di-2-hydroxyethyl-2-hydroxydodecylamine, alkyl(C8-C18)benzyl dimethyl ammonium chloride, ethylene bis alkyl(C8-C18)amide, stearyl diethanolamide, lauryl diethanolamide, myristyl diethanolamide, palmityl diethanolamide and the like, for example. Among them, the amine compound or the amide compound containing the hydroxyalkyl group is preferably used. In this invention, two or more of these compounds may be used in combination.

It is preferable that 0.01 to 10 parts by mass of the surface active agent be added with respect to 100 parts by mass of the alicyclic hydrocarbon polymer from a viewpoint of effectively inhibiting the white turbidity of a molded product associated with the fluctuation in temperature and humidity and maintaining high light transmission of the molded product. An added amount of the surface active agent is more preferably set to 0.05 to 5 parts by mass and still more preferably set to 0.3 to 3 parts by mass with respect to 100 parts by mass of alicyclic hydrocarbon polymer.

(Plasticizer)

A plasticizer is added as needed for adjusting a melt index of the copolymer.

As the plasticizer, a well-known one such as bis(2-ethylhexyl)adipate, bis(2-butoxyethyl)adipate, bis(2-ethylhexyl) azelate, dipropylene glycol dibenzoate, tri-n-butyl citrate, acetyl tri-n-butyl citrate, epoxidized soybean-oil, 2-ethylhexyl epoxidized tall oil, chloroparaffin, tri-2-ethylhexyl phosphate, tricresyl phosphate, phosphate-t-butylphenyl, tri-2-ethylhexyl diphenyl phosphate, dibutyl phthalate, diisohexyl phthalate, diheptyl phthalate, dinonyl phthalate, diundecyl phthalate, di-2-ethylhexyl phthalate, diisononyl phthalate, diisodecyl phthalate, ditridecyl phthalate, butyl benzyl phthalate, dicyclohexyl phthalate, di-2-ethylhexyl sebacate, trimellitic acid tri-2-ethylhexyl, Santicizer 278, Paraplex G40, Drapex 334F, Plastolein 9720, Mesamoll, DNODP-610, and HB-40 may be applied. Selection of the plasticizer and the added amount thereof is determined appropriately under a condition that transmission of the copolymer and resistance to environmental change are not damaged.

A cycloolefin resin is preferably used as the resin and specifically, ZEONEX from ZEON CORPORATION, APEL from Mitsui Chemicals, Inc., TOPAS from TOPAS ADVANCED POLYMERS, Inc., ARTON from JSR Corporation and the like are preferable examples.

The Abbe number of the material to form the objective lens is preferably not smaller than 50.

The objective lens is hereinafter described.

When an effective diameter (mm) of the objective lens when the first optical disc is used is represented by $\phi 1$, the objective lens satisfying a following equation is preferably used in a so-called slim-type optical pickup device. Such an objective lens may also be used in an optical pickup device other than this.

$$1.9 \leq \phi 1 \leq 3.0 \quad (27)$$

It is preferable that a following equation be satisfied from a viewpoint of certainly ensuring the working distance in the third optical disc such as the CD.

$$2.0 \leq \phi 1 \leq 3.0 \quad (27)'$$

Further, at least one optical surface of the objective lens at least includes the central region, the intermediate region around the central region, and the peripheral region around the intermediate region. Although the central region is preferably a region including the optical axis of the objective lens, it is also possible that a minute region including the optical axis is made an unused region or a region for special application and a region around the same may be made a center region (also referred to as the central region). The central region, the intermediate region, and the peripheral region are preferably provided on the same optical surface. As illustrated in FIG. 4, a central region CN, an intermediate region MD, a peripheral region OT are preferably concentrically provided around the optical axis on the same optical surface. The first optical path difference providing structure is provided on the central region of the objective lens and the second optical path difference providing structure is provided on the intermediate region. The peripheral region may be the refractive surface and the third optical path difference providing structure may be provided on the peripheral region. Although the central region, the intermediate region, and the peripheral region are preferably adjacent to each other, slight clearance may be present therebetween.

It may be said that the central region of the objective lens is a common region to the first, second, and third optical discs used for recording or reproducing of the first optical disc, the second optical disc, and the third optical disc. That is to say, the objective lens converges the first light flux, which passes through the central region, on the information recording surface of the first optical disc such that the information may be recorded and/or reproduced, converges the second light flux, which passes through the central region, on the information recording surface of the second optical disc such that the information may be recorded/reproduced, and converges the third light flux, which passes through the central region, on the information recording surface of the third optical disc such that the information may be recorded/reproduced. Also, the first optical path difference providing structure provided on the central region preferably corrects the spherical aberration generated by a difference between the thickness t1 of the protective substrate of the first optical disc and the thickness t2 of the protective substrate of the second optical disc and the spherical aberration generated by a difference in wavelength between the first light flux and the second light flux for the first light flux and the second light flux, which pass through the first optical path difference providing structure. Further, the first optical path difference providing structure preferably corrects the spherical aberration generated by a difference between the thickness t1 of the protective substrate of the first optical disc and the thickness t3 of the protective substrate of the third optical disc and the spherical aberration generated by a difference in wavelength between the first light flux and the third light flux for the first light flux and the third light flux, which pass through the first optical path difference providing structure.

It may be said that the intermediate region of the objective lens is a common region to the first and second optical discs, which is used for recording or reproducing of the first optical disc and the second optical disc and is not used for recording or reproducing of the third optical disc. That is to say, the objective lens converges the first light flux, which passes through the intermediate region, on the information recording surface of the first optical disc such that the information may be recorded/reproduced and converges the second light flux, which passes through the intermediate region, on the information recording surface of the second optical disc such that the information may be recorded/reproduced. On the other hand, this does not converge the third light flux, which passes through the intermediate region, on the information recording surface of the third optical disc such that the information may be recorded/reproduced. The third light flux, which passes through the intermediate region of the objective lens, preferably forms the flare on the information recording surface of the third optical disc. As illustrated in FIG. 5, a spot formed by the third light flux, which passes through the objective lens, on the information recording surface of the third optical disc preferably has a spot center portion SCN with high light amount density, a spot intermediate portion SMD with light amount density lower than that of the spot center portion, and a spot peripheral portion SOT with the light amount density higher than that of the spot intermediate portion and lower than that of the spot center portion in this order from an optical axis side (or the spot center portion) to outside. The spot center portion is used for recording/reproducing the information of the optical disc and the spot intermediate portion and the spot peripheral portion are not used for recording/reproducing the information of the optical disc. In the description above, the spot peripheral portion is referred to as the flare. In a type in which the spot intermediate portion is not present and the spot peripheral portion is present around the spot center portion, that is to say, in a case in which the light forms a weak large spot around the light converging spot, the spot peripheral portion may also be referred to as the flare. That is to say, it may be said that the third light flux, which passes through the intermediate region of the objective lens, preferably forms the spot peripheral portion on the information recording surface of the third optical disc.

It may be said that the peripheral region of the objective lens is a region dedicated for the first optical disc, which is used for recording or reproducing of the first optical disc and is not used for recording or reproducing of the second optical disc and the third optical disc. That is to say, the objective lens converges the first light flux, which passes through the peripheral region, on the information recording surface of the first optical disc such that the information may be recorded/reproduced. On the other hand, this does not converge the second light flux, which passes through the peripheral region, on the information recording surface of the second optical disk such that the information may be recorded/reproduced, and does not converge the third light flux, which passes through the peripheral region, on the information recording surface of the third optical disk such that the information may be recorded/reproduced. The second light flux and the third light flux, which pass through the peripheral region of the objective lens, preferably form the flare on the information recording surfaces of the second optical disc and the third optical disc. That is to say, the second light flux and the third light flux, which pass through the peripheral region of the objective lens, preferably form the spot peripheral portion on the information recording surfaces of the second optical disc and the third optical disc.

The first optical path difference providing structure is preferably provided on a region covering not less than 70% of an area of the central region of the objective lens and more preferably, this covers not less than 90% of the area. More preferably, the first optical path difference providing structure is provided on an entire surface of the central region. The second optical path difference providing structure is preferably provided on a region covering not less than 70% of an area of the intermediate region of the objective lens and more preferably, this covers not less than 90% of the area. More preferably, the second optical path difference providing structure is provided on an entire surface of the intermediate region. When the peripheral region includes a third optical path difference providing structure, the third optical path difference providing structure is preferably provided on a region covering not less than 70% of an area of the peripheral region of the objective lens and more preferably, this covers not less than 90% of the area. More preferably, the third optical path difference providing structure is provided on an entire surface of the peripheral region.

Meanwhile, the optical path difference providing structure in this description is a collective term for structures to add an optical path difference to an incident light flux. The optical path difference providing structure also includes a phase difference providing structure to provide a phase difference. The phase difference providing structure also includes the diffraction structure. The optical path difference providing structure of the present invention is preferably the diffraction structure. The optical path difference providing structure includes the step, and this preferably includes a plurality of steps. The step adds the optical path difference and/or the phase difference to the incident light flux. The optical path difference added by the optical path difference providing structure may be an integral multiple of a wavelength of the incident light flux or a non-integral multiple of the wavelength of the incident light flux. The steps may be arranged at a cyclical interval in the direction perpendicular to the optical axis or may be arranged at a non-cyclical interval in the direction perpendicular to the optical axis. Also, in a case in which the objective lens provided with the optical path difference providing structure is a single aspherical lens, an incident angle of the light flux to the objective lens is different depending on the height from the optical axis, so that a step amount of the optical path difference providing structure is slightly different for each annular zone. For example, in a case in which the objective lens is a single aspherical convex lens, even when the optical path difference providing structure provides the same optical path difference, the step amount tends to be larger as this is farther from the optical axis in general.

The diffraction structure in this description is a collective term for structures with the step, which allow the light flux to have a function to converge or diverge by the diffraction. For example, this is formed of a plurality of unit shapes arranged around the optical axis and includes a structure in which the light flux enters each unit shape, a wave surface of transmitted light generates displacement for each adjacent annular zone, and eventually, a new wave surface is formed to allow the light to converge or diverge. The diffraction structure preferably includes a plurality of steps and the steps may be arranged at the cyclical interval in the direction perpendicular to the optical axis or may be arranged at the non-cyclical interval in the direction perpendicular to the optical axis. Also, in a case in which the objective lens provided with the diffraction structure is the single aspherical lens, the incident angle of the light flux to the objective lens is different depending on the height from the optical axis, so that the step amount of the diffraction structure is slightly different for each annular zone. For example, in a case in which the objective lens is the single aspherical convex lens, even when the diffraction structure generates the diffracted light of the same diffraction order, the step amount tends to be larger as this is farther from the optical axis in general.

The optical path difference providing structure preferably includes a plurality of annular zones concentrically arranged around the optical axis. The optical path difference providing structure may take various cross-sectional shapes (cross-sectional shape on a surface including the optical axis) in general and the cross-sectional shapes including the optical axis are largely classified into the blazed structure and a footstep structure.

The blazed structure is a structure in which a cross-sectional shape of the optical element having the optical path difference providing structure including the optical axis is a sawtooth-pattern shape as illustrated in FIGS. 6A and 6B. Meanwhile, in examples of FIGS. 6A and 6B, it is assumed that an upper side is a light source side and a lower side is an optical disc side and the optical path difference providing structure is formed on a planar surface as the base aspherical surface. In the blazed structure, a length in the direction perpendicular to the optical axis of one blaze unit is referred to as a pitch width (refer to FIGS. 6A and 6B). Also, a length of a step in a direction parallel to the optical axis of a blaze is referred to as a step amount B (refer to FIG. 6A).

Also, the footstep structure is a structure in which the cross-sectional shape of the optical element having the optical path difference providing structure including the optical axis includes a plurality of small steps (referred to as a step unit) as illustrated in FIGS. 6C and 6D.

For example, the optical path difference providing structure illustrated in FIG. 6C is referred to as a 5-level footstep structure and the optical path difference providing structure illustrated in FIG. 6D is referred to as a 2-level footstep structure (also referred to as a binary structure).

Meanwhile, the optical path difference providing structure preferably is a structure in which a certain unit shape is cyclically repeated. Herein, the structure in which "the unit shape is cyclically repeated" naturally includes the shape in which the same shape is repeated at a same cycle. Further, a shape having a cycle of the unit shape, which becomes one unit of the cycle, gradually becomes longer or shorter regularly is also included in the structure in which "the unit shape is cyclically repeated".

When the optical path difference providing structure has the blazed structure, the shape is such that the sawtooth-pattern shape, which is the unit shape, is repeated. The same sawtooth-pattern shape may be repeated as illustrated in FIG. 6A or the shape may be such that the pitch of the sawtooth-pattern shape gradually becomes longer or gradually becomes shorter in a direction away from the optical axis as illustrated in FIG. 6B. In addition, the shape may be such that the step of the blazed structure faces in the direction opposite to the optical axis (center side) in a certain region, the step of the blazed structure faces in the direction of the optical axis (center side) in another region, and a transition region required for switching the direction of the step of the brazed structure may be provided therebetween. When the structure is such that the direction of the step of the blazed structure is switched in midstream in this manner, an annular zone pitch may be widened and deterioration in transmission due to the manufacturing error of the optical path difference providing structure may be inhibited.

Although the first optical path difference providing structure and the second optical path difference providing structure may be provided on different optical surfaces of the objective lens respectively, they are preferably provided on the same optical surface. Further, also when the third optical path difference providing structure is provided, it is preferably provided on the same optical surface as the first optical path difference providing structure and the second optical path difference providing structure. This is preferably provided on the same optical surface because an eccentric error at the time of manufacture may be reduced. Also, the first optical path difference providing structure, the second optical path difference providing structure, and the third optical path difference providing structure are preferably provided on a surface on the light source side of the objective lens rather than a surface on the optical disc side of the objective lens. In other words, the first optical path difference providing structure, the second optical path difference providing structure, and the third optical path difference providing structure are preferably provided on the optical surface with a smaller absolute value of a curvature radius of the objective lens.

Next, the first optical path difference providing structure provided on the central region is described. The first optical path difference providing structure is preferably a structure obtained by superimposing only the first base structure and the second base structure on each other.

The first base structure is preferably the blazed structure. The first base structure makes the amount of the A-th order diffracted light of the first light flux, which passes through the first base structure, larger than the amount of the diffracted light of any other order, makes the amount of the B-th order diffracted light of the second light flux, which pass through the first base structure, larger than the amount of the diffracted light of any other order, and makes the amount of the C-th order diffracted light of the third light flux, which passes through the first base structure, larger than the amount of the diffracted light of any other order. Herein, $|A|=1$, $|B|=1$, and $|C|=1$ are satisfied. According to this, since the step amount of the first base structure does not become too large, the manufacture is easy and the light amount loss due to the manufacturing error may be inhibited and the fluctuation in the diffraction efficiency during the fluctuation in wavelength may also be reduced, so that this is preferable.

The step of the first base structure may face to the optical axis or face opposite to the optical axis. Also, the direction of the step of the first base structure may be switched in the middle of the central region as illustrated in FIGS. 14A and 14B. FIG. 14A illustrates an example in which the step faces to the optical axis in a position close to the optical axis but the direction of the step is switched in midstream and the step faces opposite to the optical axis in a position apart from the optical axis. FIG. 14B illustrates an example in which the step faces opposite to the optical axis in the position close to the optical axis but the direction of the step is switched in midstream and the step faces to the optical axis in the position apart from the optical axis. The direction of the step of the first base structure desirably conforms to the direction of the step of the third base structure, but they do not necessarily conform to each other. The fact that "the step faces to the optical axis" is intended to mean a state in FIG. 7A and the fact that "the step faces opposite to the optical axis" is intended to mean a state in FIG. 7B.

However, the working distance may be sufficiently ensured when the CD is used even with a thick objective lens with a large axial thickness compatibly used for the three types of optical discs, which are the BD, the DVD, and the CD by allowing the step of the first base structure to face in the direction opposite to the optical axis.

It is preferable that the first base structure have the paraxial power for the first light flux from a viewpoint of sufficiently ensuring the working distance when the CD is used also with the thick objective lens with the large axial thickness compatibly used for the three types of optical discs, which are the BD, the DVD, and the CD. Herein, the fact "to have paraxial power" is intended to mean that C2 is not 0 when the optical path difference function of the first base structure is represented by an equation (2) to be described later.

The second base structure is also preferably the blazed structure. The second base structure makes the amount of the D-th order diffracted light of the first light flux, which passes through the second base structure, larger than the amount of the diffracted light of any other order, makes the amount of the E-th order diffracted light of the second light flux, which passes through the second base structure, larger than the amount of the diffracted light of any other order, and makes the amount of the F-th order diffracted light of the third light flux, which passes through the second base structure, larger than the amount of the diffracted light of any other order. Herein $|D|=2$, $|E|=1$, and $|F|=1$ are satisfied. According to this, since the step amount of the second base structure does not become too large, the manufacture is easy, the light amount loss due to the manufacturing error may be inhibited, and the fluctuation in the diffraction efficiency during the fluctuation in wavelength may be reduced, so that this is preferable.

The step of the second base structure may face in the direction of the optical axis or face in the direction opposite to the optical axis. Also, the direction of the step of the second base structure may be switched in the middle of the central region as illustrated in FIGS. 14A and 14B. The direction of the step of the second base structure desirably conforms to the direction of the step of the fourth base structure, but they do not necessarily conform to each other.

By superimposing the first base structure and the second base structure on each other such that the directions of the steps thereof differ from each other, it becomes possible to inhibit the height of the step after they are superimposed on each other as compared to a case in which they are superimposed on each other such that the steps of the first base structure and the second base structure face in the same direction, and according to this, the light amount loss due to the manufacturing error may be inhibited and it becomes possible to inhibit the fluctuation in the diffraction efficiency during the fluctuation in wavelength.

It becomes possible not only to realize the compatibility with the three types of the optical discs, which are the BD, the DVD, and the CD but also to provide the objective lens with balanced light use efficiency capable of maintaining the high light use efficiency for any of the three types of optical discs, which are the BD, the DVD, and the CD. For example, it is also possible to provide the objective lens with the diffraction efficiency with respect to the wavelength $\lambda 1$ of 80% or larger, the diffraction efficiency with respect to the wavelength $\lambda 2$ of 60% or larger, and the diffraction efficiency with respect to the wavelength $\lambda 3$ of 50% or larger. Further, it is also possible to provide the objective lens with the diffraction efficiency with respect to the wavelength $\lambda 1$ of 80% or larger, the diffraction efficiency with respect to the wavelength $\lambda 2$ of 70% or larger, and the diffraction efficiency with respect to the wavelength $\lambda 3$ of 60% or larger. Meanwhile, by changing the aberration in an under-corrected (insufficiently-corrected) direction when the wavelength fluctuates on a long wavelength side, it becomes possible to inhibit the aberration occurring when temperature of the optical pickup device increases, and it becomes possible to provide the objective lens capable of maintaining a stable performance even when the temperature changed when the objective lens is made of plastic.

When the objective lens is made of plastic, in order to maintain the stable performance even when the temperature changed, both of a third-order spherical aberration and a fifth-order spherical aberration occurring in the objective lens when the wavelength becomes longer are preferably under-corrected (insufficiently-corrected).

In the first optical path providing structure of the present invention, the height of the step may be made very low. Therefore, it becomes possible to further reduce the manufacturing error, thereby further inhibiting the light amount loss, and it becomes possible to further inhibit the fluctuation in diffraction efficiency during the fluctuation in wavelength.

It is also preferable that a minimum annular zone width of the first optical path difference providing structure be not larger than 15 μm. From this point of view, a ratio bw/f1 of a minimum annular zone width bw of the first optical path difference providing structure and the focal distance f1at the first wavelength $\lambda 1$ preferably is not larger than 0.004. More preferably, this is not larger than 10 μm. Also, a mean annular zone width of the first optical path difference providing structure is preferably not larger than 30 μm. More preferably, this is not larger than 20 μm. By configuring in this manner, it becomes possible to obtain an under-wavelength property of an appropriate level as described above and it is possible to keep a best focus position of required light used for recording/reproducing the information of the third optical disc away from a best focus position of non-required light, which is not used for recording/reproducing the information of the third optical disc, generated in the third light flux, which passes through the first optical path difference providing structure, so that false detection may also be reduced. Meanwhile, the mean annular zone width is obtained by summing all the annular zone widths of the first optical path difference providing structure of the central region and dividing the same by the number of steps of the first optical path difference providing structure of the central region.

Herein, the axial chromatic aberration of the objective lens of the present invention is preferably not larger than 0.9 μm/nm. Further, the axial chromatic aberration is preferably set to 0.8 μm/nm or smaller. The axial chromatic aberration might be deteriorated when the pitch of the first base structure is made too small, so that it is preferable to design the pitch such that the axial chromatic aberration is not larger than 0.9 μm/nm. From this point of view, a ratio p/f1 of a minimum pitch p of the first optical path difference providing structure and the focal distance f1 at the first wavelength $\lambda 1$ is preferably not smaller than 0.002.

A first best focus position in which light intensity of the spot formed by the third light flux is the highest and a second best focus position in which the light intensity of the spot formed by the third light flux is the next highest by the third light flux, which passes through the first optical path difference providing structure, preferably satisfy a following condition equation (28). Meanwhile, the best focus position is herein intended to mean a position in which a beam waist becomes the minimum within a certain defocus range. The first best focus position is the best focusing position of the required light used for recording/reproduction of the third optical disc and the second best focus position is the best focus position of the light flux of which light volume is the largest out of the non-required light, which is not used for recording/reproduction of the third optical disc.

$$0.05 \leq L/f13 \leq 0.35 \tag{28}$$

where f13 [mm] represents the focal distance of the third light flux, which passes through the first optical path difference providing structure to form the first best focus, and L [mm] represents a distance between the first best focus and the second best focus.

More preferably, a following condition equation (28)' is satisfied.

$$0.25 \leq L/f13 \leq 0.35 \tag{28'}$$

Some preferred examples of the above-described first optical path difference providing structure are illustrated in FIGS. 8A, 8B, and 8C. Meanwhile, although it is illustrated such that a first optical path difference providing structure ODS1 is provided in a planar manner for convenience in FIGS. 8A, 8B, and 8C, this may also be provided on the simple aspherical convex surface. A first base structure BS1, which is the (1/1/1) diffraction structure, is superimposed on a second base structure BS2, which is the (2/1/1) diffraction structure. In FIG. 8A, the step of the second base structure BS2 faces in the direction of the optical axis OA and the step of the first base structure BS faces in the direction opposite to the optical axis OA. Further, it is understood that the pitch of the first base structure BS1 and that of the second base structure BS2 are matched each other and the positions of all the steps of the second base structure and the position of the step of the first base structure conform to each other. FIG. 8A also applies to a case in which the structure in FIG. 1B and the structure in FIG. 2B are superimposed on each other. Next, in FIG. 8B, the step of the second base structure BS2 faces in the direction of the optical axis OA and the step of the first base structure BS also faces in the direction of the optical axis OA. Further, it is understood that the pitch of the first base structure BS1 and that of the second base structure BS2 are matched each other and the positions of all the steps of the second base structure and the position of the step of the first base structure conform to each other. FIG. 8B also applies to a case in which the structure in FIG. 1C and the structure in FIG. 2C are superimposed on each other. Next, in FIG. 8C, the step of the second base structure BS2 faces in the direction opposite to the optical axis OA and the step of the second base structure BS also faces in the direction opposite to the optical axis OA. Further, it is understood that the pitch of the first base structure BS1 and that of the second base structure BS2 are matched each other and the positions of all the steps of the second base structure and the position of the step of the first base structure conform to each other. FIG. 8C also applies to a case in which the structure in FIG. 1A and the structure in FIG. 2A are superimposed on each other.

Next, the second optical path difference providing structure provided on the intermediate region is described. The second optical path difference providing structure is preferably a structure obtained by superimposing only the two base structures, which are the third base structure and the fourth base structure.

The third base structure makes the amount of the A-th order diffracted light of the first light flux, which passes through the third base structure, larger than the amount of the diffracted light of any other order, makes the amount of the B-th order diffracted light of the second light flux, which passes through the third base structure, larger than the amount of the diffracted light of any other order, and makes the amount of the C-th order diffracted light of the third light flux, which passes through the third base structure, larger than the amount of the diffracted light of any other order. Herein, |A|=1, |B|=1, and |C|=1 are satisfied. The fourth base structure makes the amount of the C-th order diffracted light of the first light flux, which passes through the fourth base structure, larger than the amount of the diffracted light of any other order, makes the amount of the D-th order diffracted light of the second light flux, which passes through the fourth base structure, larger than the amount of the diffracted light of any other order, and makes the amount of the F-th order diffracted light of the third light flux, which passes through the fourth base structure, larger than the amount of the diffracted light of any other order. Herein, |D|=2, |E|=1, and |F|=1 are satisfied.

The steps of the third base structure and the fourth base structure may face in the direction of the optical axis or face in the direction opposite to the optical axis. Also, the direction of the step of the third base structure and/or the fourth base structure may be switched in the middle of the central region as illustrated in FIGS. 14A and 14B.

When a structure of which step amount is large such as the binary structure of 0/0/±1 is superimposed on the second optical path difference providing structure as the third base structure for creating the flare, a problem such as deterioration in the diffraction efficiency due to the manufacturing error and the deterioration in the diffraction efficiency due to the shadow effect and the like becomes larger. Therefore, in the second optical path difference providing structure, a structure obtained by superimposing only structures other than the third base structure and the fourth base structure on each other is preferable because this may improve the light use efficiency. Especially, when an effective diameter of the first light flux is small such as from 1.9 mm to 3.0 mm, the annular zone width is already sufficiently narrow and the number of the annular zones is sufficiently large in the second optical path difference providing structure formed of the third base structure and the fourth base structure, so that when another base structure is superimposed in addition to the third base structure and the fourth base structure, the annular zone width becomes further narrower and the number of the annular zones becomes further larger, and the problem such as the deterioration in the diffraction efficiency due to the manufacturing error and the deterioration in the diffraction efficiency due to the shadow effect of the annular zone becomes larger.

It is possible to provide any optical path difference providing structure when providing the third optical path difference providing structure on the peripheral region. The third optical path difference providing structure preferably includes a fifth base structure. The fifth base structure makes an amount of P-th order diffracted light of the first light flux, which passes through the fifth base structure, larger than the amount of the diffracted light of any other order, makes an amount of Q-th order diffracted light of the second light flux, which passes through the fifth base structure, larger than the amount of the diffracted light of any other order, and makes an amount of R-th order diffracted light of the third light flux, which passes through the fifth base structure, larger than the amount of the diffracted light of any other order. Meanwhile, P is preferably set to 5 or smaller for inhibiting the fluctuation in the diffraction efficiency during the fluctuation in wavelength. P is more preferably set to 2 or smaller.

An image-side numerical aperture of the objective lens required for reproducing/recording the information from/on the first optical disc is represented by NA1, the image-side numerical aperture of the objective lens required for reproducing/recording the information from/on the second optical disc is represented by NA2 (NA1>NA2), and the image-side numerical aperture of the objective lens required for reproducing/recording the information from/on the third optical disc is represented by NA3 (NA2>NA3). NA1 is preferably not smaller than 0.75 and not larger than 0.9 and more preferably not smaller than 0.8 and not larger than 0.9. Especially, NA1 is preferably 0.85. NA2 is preferably not smaller than 0.55 and not larger than 0.7. Especially, NA2 is preferably 0.60 or 0.65. NA3 is preferably not smaller than 0.4 and not larger than 0.55. Especially, NA3 is preferably 0.45 or 0.53.

The boundary between the central region and the intermediate region of the objective lens is preferably formed on a portion corresponding to a range not smaller than 0.9·NA3 and not larger than 1.2·NA3 (more preferably not smaller than 0.95·NA3 and not larger than 1.15·NA3) when the third light flux is used. More preferably, the boundary between the central region and the intermediate region of the objective lens is formed on a portion corresponding to NA3. The boundary between the intermediate region and the peripheral region of the objective lens is preferably formed on a portion corresponding to a range not smaller than 0.9·NA2 and not larger than 1.2·NA2 (more preferably not smaller than 0.95·NA2 and not larger than 1.15·NA2) when the second light flux is used. More preferably, the boundary between the intermediate region and the peripheral region of the objective lens is formed on a portion corresponding to NA2.

When the third light flux, which passes through the objective lens, is converged on the information recording surface of the third optical disc, the spherical aberration preferably has at least one discontinuous portion. In this case, the discontinuous portion is preferably present in a range not smaller than 0.9·NA3 and not larger than 1.2·NA3 (more preferably, not smaller than 0.95·NA3 and not larger than 1.15·NA3) when the third light flux is used.

Also, the objective lens preferably satisfies a following condition equation (15).

$$0.8 \leq d/f1 \leq 1.5 \quad (15)$$

where d represents the thickness (mm) of the objective lens on the optical axis and f1 represents the focal distance of the objective lens in the first light flux.

When the objective lens is compatible with the short-wavelength and high-NA optical disc such as the BD, although there is a problem in which the astigmatism tends to easily occur and the eccentric coma aberration tends to easily occur therein, it becomes possible to inhibit occurrence of the astigmatism and the eccentric coma aberration when the condition equation (15) is satisfied.

When the condition equation (15) is satisfied, since the thick objective lens with the large axial thickness is realized, the working distance at recording/reproducing of the CD tends to be short; however, it is possible to sufficiently ensure the working distance at recording/reproducing of the CD by providing the first optical path difference providing structure of the present invention on the objective lens, therefore, the effect of the present invention is more significant.

Further, in order to ensure the sufficient working distance in the third optical disc, the number of the annular zones RN formed on the objective lens is preferably not smaller than 150 and not larger than 250.

The first light flux, the second light flux, and the third light flux may enter the objective lens as the parallel light or enter the objective lens as diverging light or converging light. At the time of tracking also, in order to prevent the occurrence of the coma aberration, all of the first light flux, the second light flux, and the third light flux preferably enter the objective lens as the parallel light or substantially parallel light. By using the first optical path difference providing structure of the present invention, it becomes possible to allow all of the first light flux, the second light flux, and the third light flux to enter the objective lens as the parallel light or the substantially parallel light, so that the effect of the present invention becomes more significant. When the first light flux is the parallel light or the substantially parallel light, imaging magnification m1 of the objective lens when the first light flux enters the objective lens preferably satisfies a following equation (16).

$$-0.003 \leq m1 \leq 0.003 \quad (16)$$

When the second light flux is allowed to enter the objective lens as the parallel light or the substantially parallel light, imaging magnification m2 of the objective lens when the second light flux enters the objective lens preferably satisfies a following equation (17).

$$-0.003 \leq m2 \leq 0.003 \quad (17)$$

On the other hand, when the second light flux is allowed to enter the objective lens as the diverging light, the imaging magnification m2 of the objective lens when the second light flux enters the objective lens preferably satisfies a following equation (20).

$$-0.02 \leq m2 \leq -0.003 \quad (20)$$

When the third light flux is allowed to enter the objective lens as the parallel light flux or the substantially parallel light flux, imaging magnification m3 of the objective lens when the third light flux enters the objective lens preferably satisfies a following equation (18).

$$-0.003 \leq m3 \leq 0.003 \quad (18)$$

On the other hand, when the third light flux is allowed to enter the objective lens as the diverging light, the image forming magnification m3 of the objective lens when the third light flux enters the objective lens preferably satisfies a following equation (21)'.

$$-0.02 \leq m3 < -0.003 \quad (21)'$$

The working distance (WD) of an objective optical element when the third optical disc is used is preferably not smaller than 0.15 mm and not larger than 1.5 mm. This is preferably not smaller than 0.19 mm and not larger than 0.7 mm. Next, WD of the objective optical element when the second optical disc is used is preferably not smaller than 0.2 mm and not larger than 0.7 mm. Further, WD of the objective optical element when the first optical disc is used is preferably not smaller than 0.25 mm and not larger than 0.7 mm.

An optical information recording/reproducing device according to the present invention includes an optical disc drive device including the above-described optical pickup device.

Herein, the optical disc drive device mounted on the optical information recording/reproducing device is described; there are the optical disc drive device of a type in which only a tray capable of holding the optical disc in a mounted state, is taken out of a main body of the optical information recording/reproducing device in which the optical pickup device and the like are stored and that of a type in which the main body of the optical disc drive device in which the optical pickup device and the like are stored itself is taken out.

The optical information recording/reproducing device, which uses the above-described types, is generally equipped with following components, but the components are not limited thereto: the optical pickup device stored in a housing and the like, a driving source of the optical pickup device such as a seek motor for moving the optical pickup device toward an inner periphery or an outer periphery of the optical disc together with the housing, a moving unit of the optical pickup device including a guide rail and the like for guiding the housing of the optical pickup device toward the inner periphery or the outer periphery of the optical disc, a spindle motor for rotary drive of the optical disc and the like.

It is preferable that the former type be provided with the tray capable of holding the optical disc in a mounted state, a loading mechanism for sliding the tray and the like in addition to the components and the latter type be not provided with the tray and the loading mechanism but each component be provided on a drawer corresponding to a chassis, which may be taken out.

Advantageous Effects of Invention

According to the present invention, it is possible to realize a small effective diameter of the thick objective lens with the large axial thickness compatibly used for the three types of optical discs, which are the BD, the DVD, and the CD while ensuring the working distance when the CD is used. By realizing the small effective diameter, it is possible to provide the objective lens for the optical pickup device suitable for the slim-type optical pickup device with a shorter focal distance and the optical pickup device using the same. By reducing the step amount of the optical path difference providing structure, it becomes possible to inhibit the light amount loss due to the shadow effect and the manufacturing error and it also becomes possible to provide the objective lens for the optical pickup device with the balanced light use efficiency capable of maintaining the high light use efficiency for any of the three types of optical discs, which are the BD, the DVD, and the CD and the optical pickup device using the same.

EMBODIMENTS TO CARRY OUT THE INVENTION

Figure 9:
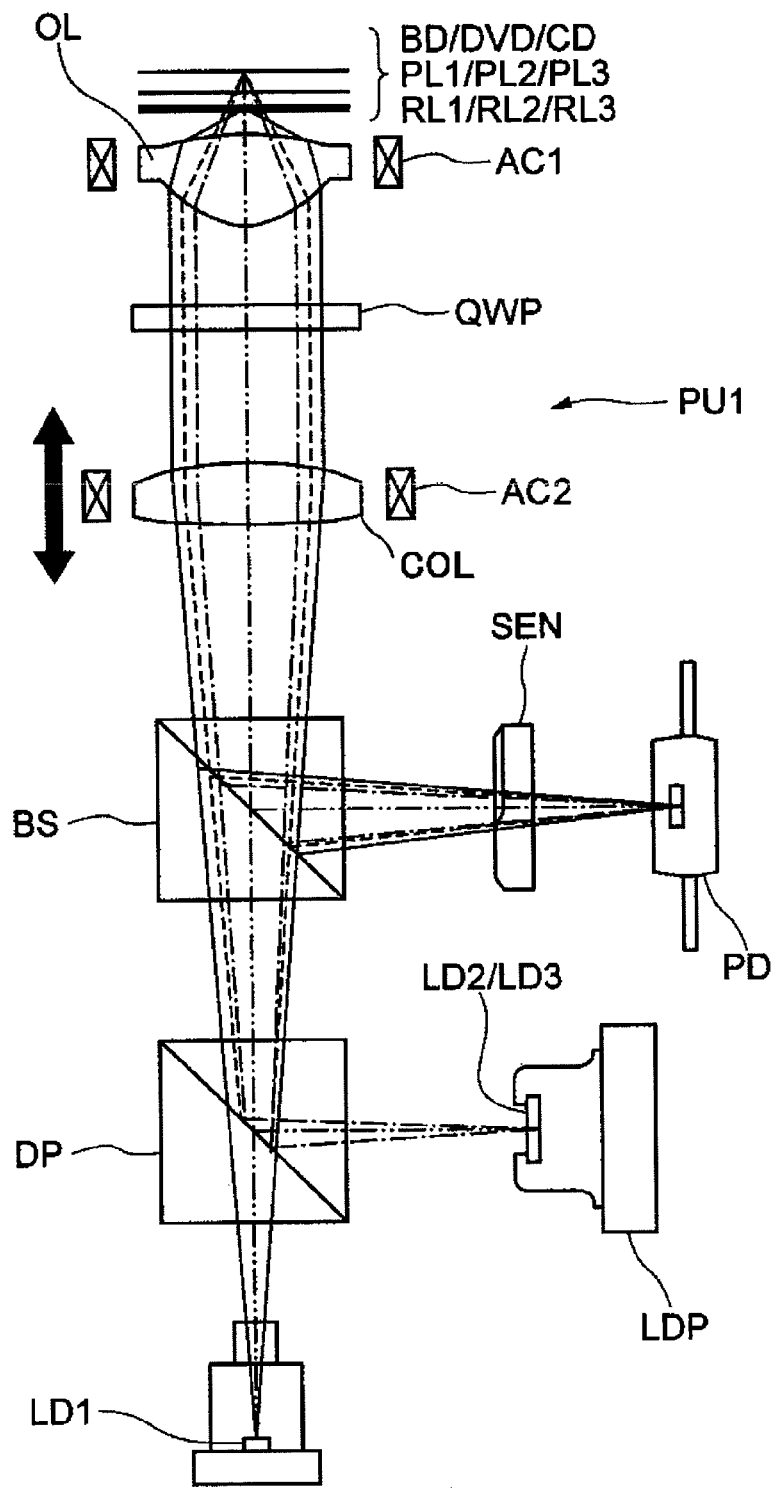
FIG. 9 is a schematic diagram of a configuration of an optical pickup device PU1 of an embodiment capable of appropriately recording and/or reproducing information on/from a BD, a DVD, and a CD, which are different optical discs.

An embodiment of the present invention will be hereinafter described with reference to the drawings. FIG. 9 is a schematic diagram of a configuration of an optical pickup device PU1 of an embodiment capable of appropriately recording and/or reproducing information on/from a BD, a DVD, and a CD, which are different optical discs. Such optical pickup device PU1 is a slim-type device and may be mounted on a thin optical information recording/reproducing device. Herein, a first optical disc is the BD, a second optical disc is the DVD, and a third optical disc is the CD. Meanwhile, the present invention is not limited to this embodiment.

The optical pickup device PU1 includes an objective lens OL, a λ/4 wavelength plate QWP, a collimate lens COL, a polarization beam splitter BS, a dichroic prism DP, a first semiconductor laser LD1 (first light source), which emits light when recording/reproducing the information on/from the BD to emit a laser light flux (first light flux) at a wavelength $\lambda 1=405$ nm, a laser unit LDP obtained by integrating a second semiconductor laser LD2 (second light source), which emits light when recording/reproducing the information on/from the DVD to emit a laser light flux (second light flux) at a wavelength $\lambda 2=660$ nm and a third semiconductor laser LD3, which emits light when recording/reproducing the information on/from the CD to emit the laser light flux (third light flux) at a wavelength $\lambda 3=785$ nm, a sensor lens SEN, a photo-receiving element PD as a photo detector and the like.

Figure 1A:
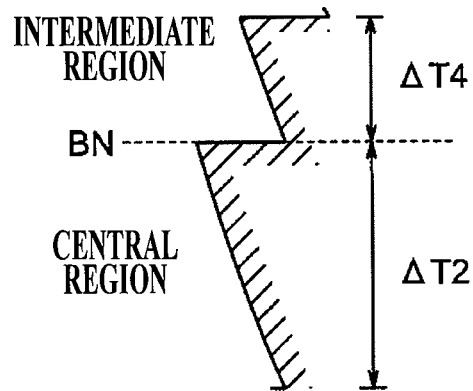
FIG. 1A is a schematic cross-sectional diagram of a second base structure and a fourth base structure along an optical axis.
Figure 1B:
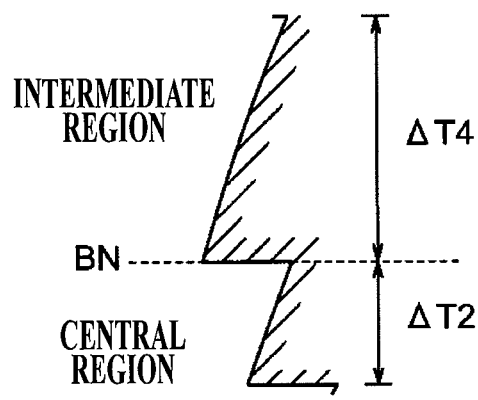
FIG. 1B is a schematic cross-sectional diagram of a second base structure and a fourth base structure along an optical axis.
Figure 1C:
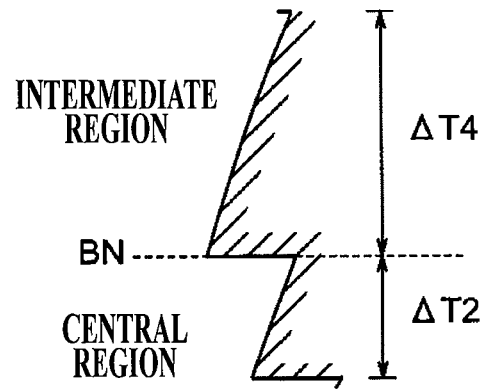
FIG. 1C is a schematic cross-sectional diagram of a second base structure and a fourth base structure along an optical axis.
Figure 2A:
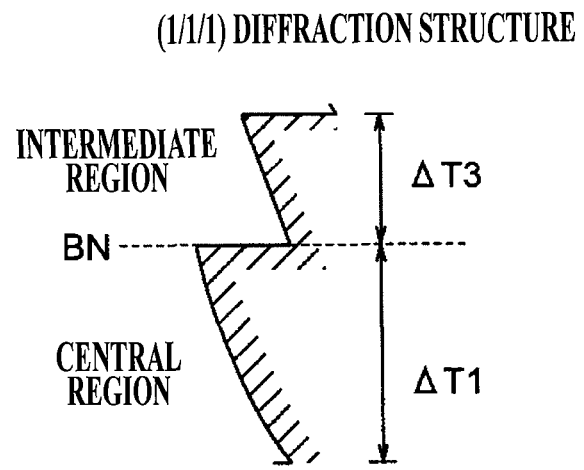
FIG. 2A is a schematic cross-sectional diagram of a first base structure and a third base structure along an optical axis.
Figure 2B:
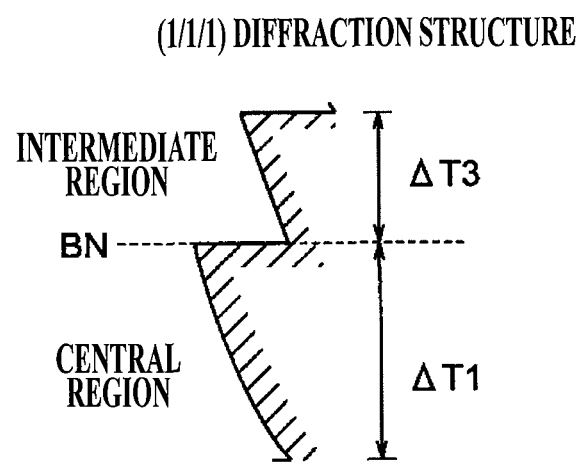
FIG. 2B is a schematic cross-sectional diagram of a first base structure and a third base structure along an optical axis.
Figure 2C:
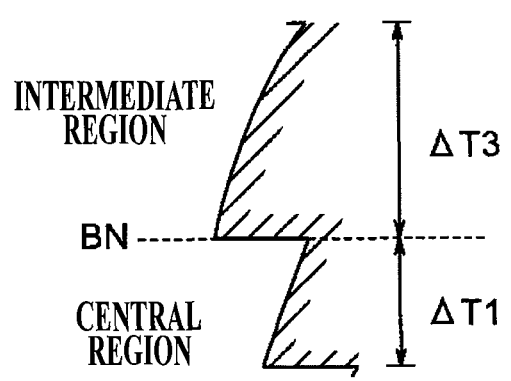
FIG. 2C is a schematic cross-sectional diagram of a first base structure and a third base structure along an optical axis.
Figure 3A:
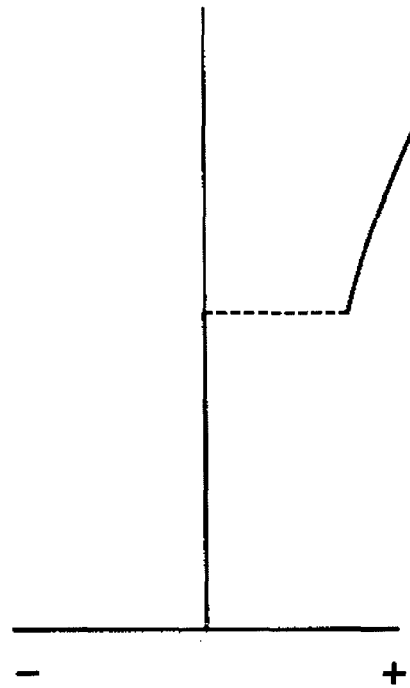
FIG. 3A is a view illustrating an example of an over-spherical aberration.
Figure 3B:
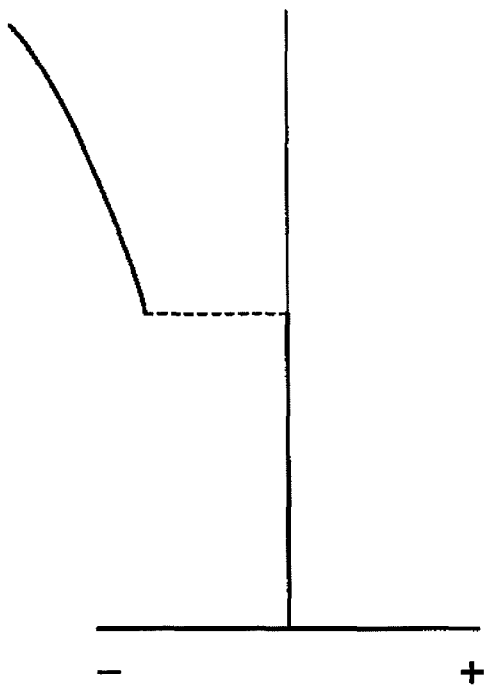
FIG. 3B is a view illustrating an example of an under-spherical aberration.
Figure 4:
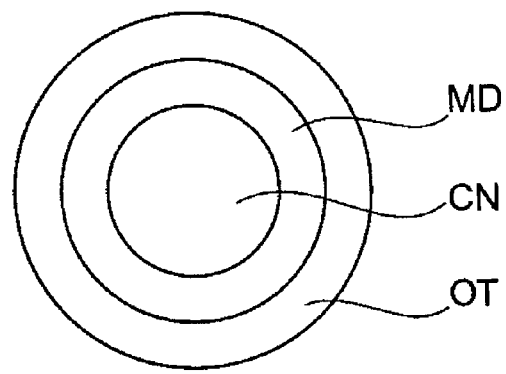
FIG. 4 is a view illustrating a single objective lens OL according to this embodiment in an optical axis direction.
Figure 5:
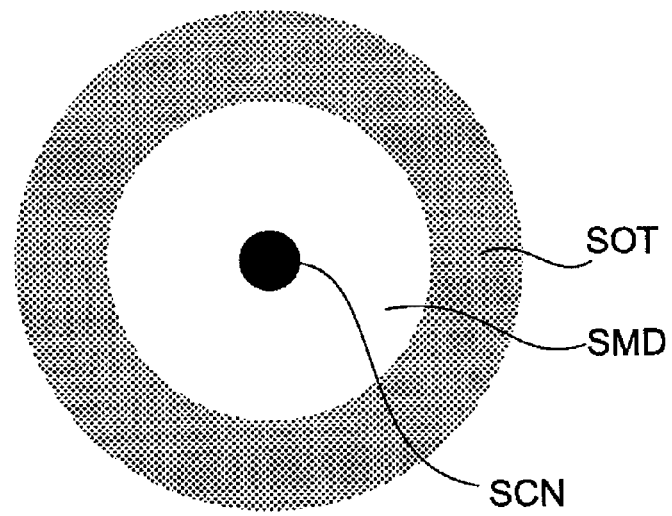
FIG. 5 is a view illustrating a state in which a third light flux, which passes through an objective lens, forms a spot formed on an information recording surface of a third optical disc.
Figure 6A:
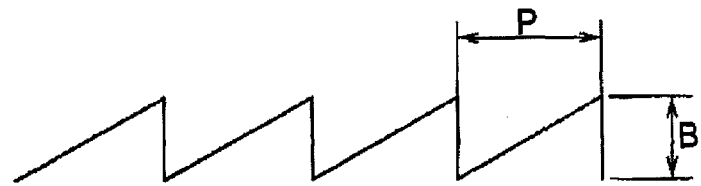
FIG. 6A is a cross-sectional view in an axial direction illustrating an example of an optical path difference providing structure.
Figure 6B:
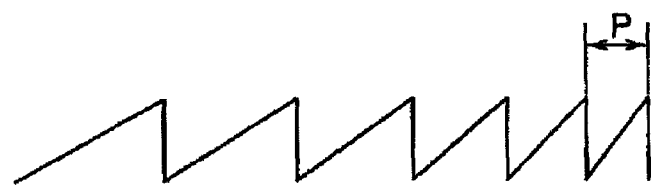
FIG. 6B is a cross-sectional view in the axial direction illustrating an example of the optical path difference providing structure.
Figure 6C:
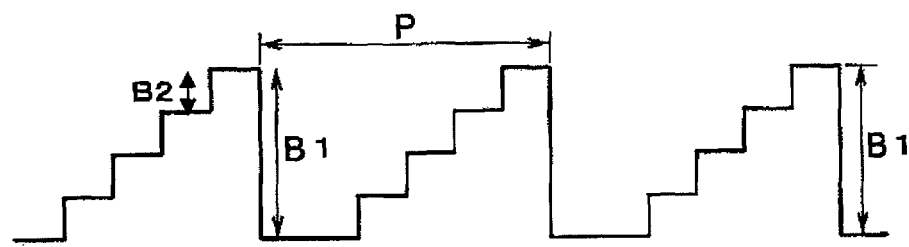
FIG. 6C is a cross-sectional view in the axial direction illustrating an example of the optical path difference providing structure.
Figure 6D:
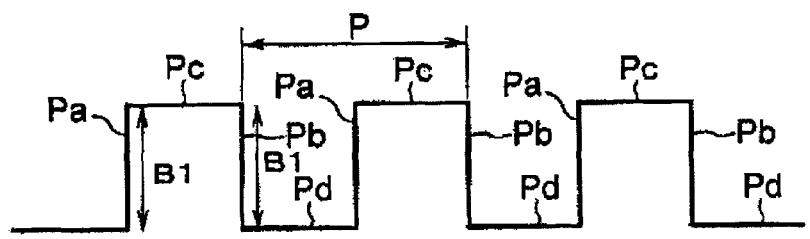
FIG. 6D is a cross-sectional view in the axial direction illustrating an example of the optical path difference providing structure.
Figure 7A:
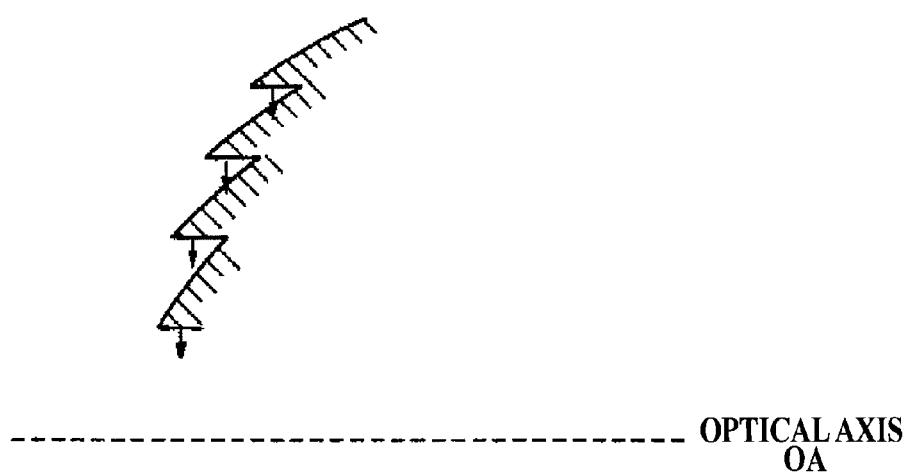
FIG. 7A is a view illustrating a state in which a step faces to an optical axis.
Figure 7B:
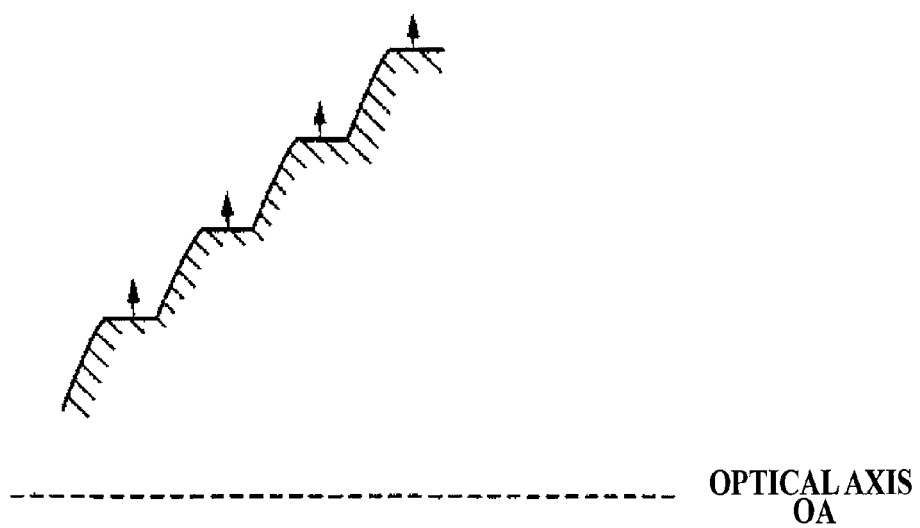
FIG. 7B is a view illustrating a state in which the step faces opposite to an optical axis.
Figure 8A:
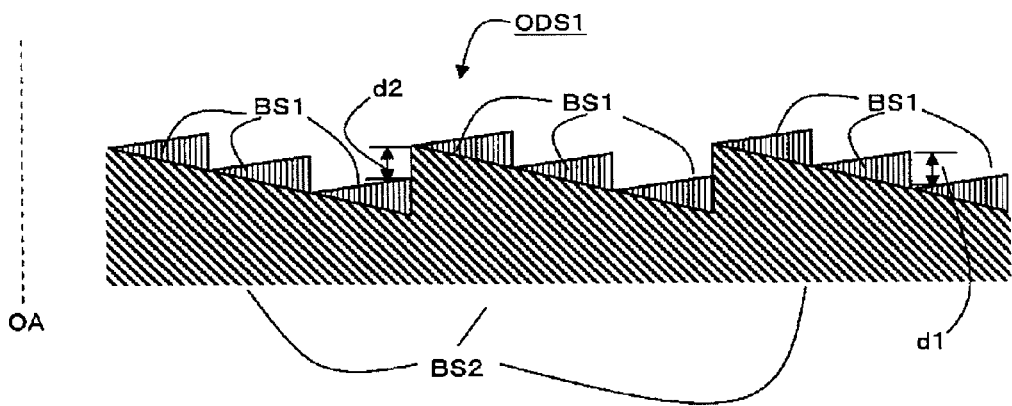
FIG. 8A is a schematic diagram of a first optical path difference providing structure.
Figure 8B:
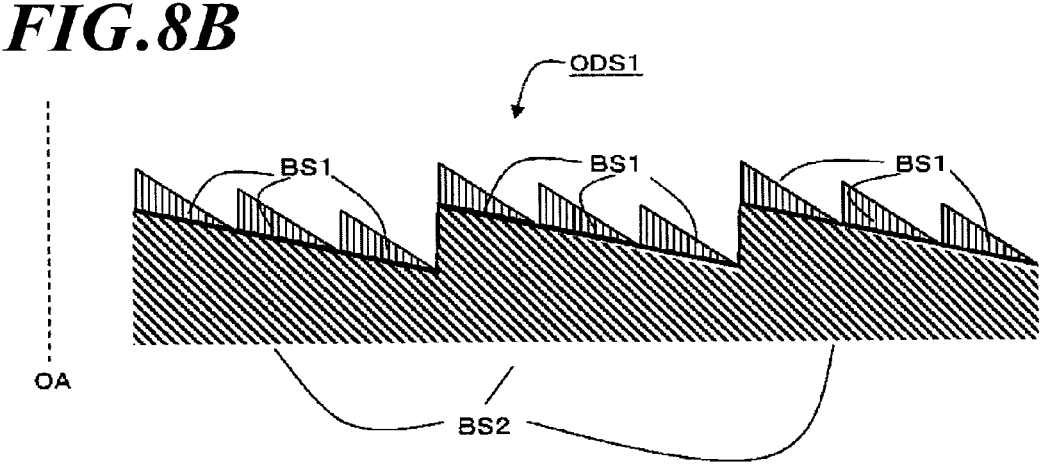
FIG. 8B is a schematic diagram of the first optical path difference providing structure.
Figure 8C:
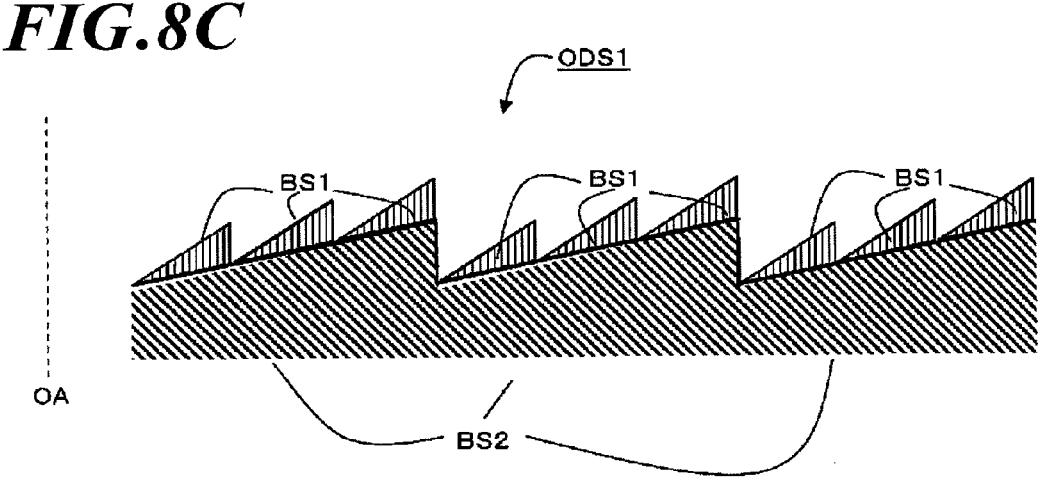
FIG. 8C is a schematic diagram of the first optical path difference providing structure.

As illustrated in FIGS. 2A, 2B, and 2C, in a single objective lens OL according to this embodiment, a central region CN including an optical axis, an intermediate region MD arranged around the same, and a peripheral region OT arranged around the same are formed on an aspherical optical surface on a light source side concentrically around the optical axis. Although not illustrated, a first optical path difference providing structure already described in detail is formed in the central region CN and a second optical path difference providing structure already described in detail is formed in the intermediate region MD. Also, a third optical path difference providing structure is formed in the peripheral region OT. In this embodiment, the third optical path difference providing structure is a blazed diffraction structure. Also, the objective lens of this embodiment is a plastic lens. The first optical path difference providing structure formed in the central region CN of the objective lens OL is a structure obtained by superimposing a first base structure and a second base structure on each other. The first base structure makes an amount of negative first-order diffracted light of the first light flux, which passes through the first base structure, larger than an amount of diffracted light of any other order, makes an amount of negative first-order diffracted light of the second light flux, which passes through the first base structure, larger than the amount of the diffracted light of any other order, and makes an amount of negative first-order diffracted light of the third light flux, which passes through the first base structure, larger than the amount of the diffracted light of any other order. The second base structure makes an amount of second-order diffracted light of the first light flux, which passes through the second base structure, larger than the amount of the diffracted light of any other order, makes an amount of first-order diffracted light of the second light flux, which passes through the second base structure, larger than the amount of the diffracted light of any other order, and makes an amount of first-order diffracted light of the third light flux, which passes through the second base structure, larger than the amount of the diffracted light of any other order.

The second optical path difference providing structure formed in the intermediate region MD of the objective lens OL is a structure obtained by superimposing a third base structure and a fourth base structure on each other. The third base structure makes the amount of the negative first-order diffracted light of the first light flux, which passes through the third base structure, larger than the amount of the diffracted light of any other order, makes the amount of the negative first-order diffracted light of the second light flux, which passes through the third base structure, larger than the amount of the diffracted light of any other order, and makes the amount of the negative first-order diffracted light of the third light flux, which passes through the third base structure, larger than the amount of the diffracted light of any other order. The fourth base structure makes the amount of the second-order diffracted light of the first light flux, which passes through the fourth base structure, larger than the amount of the diffracted light of any other order, makes the amount of the first-order diffracted light of the second light flux, which passes through the fourth base structure, larger than the amount of the diffracted light of any other order, and makes the amount of the first-order diffracted light of the third light flux, which passes through the fourth base structure, larger than the amount of the diffracted light of any other order.

A pitch P1 of the first base structure closest to a boundary, a pitch P3 of the third base structure closest to the boundary, a pitch P2 of the second base structure closest to the boundary, and a pitch P4 of the forth base structure closest to the boundary across the boundary between the central region and the intermediate region of the objective lens satisfy following equations (1) and (3).

$$P3-P1<0 \quad (3)$$

$$P4-P2<0 \quad (1)$$

As indicated by a solid line, a diverging light flux of the first light flux (λ1=405 nm) emitted from a blue-violet semiconductor laser LD1 passes through the dichroic prism DP and the polarization beam splitter BS, thereafter passes through the collimate lens COL to be parallel light, linear polarization of which is converted to circular polarization by the λ/4 wavelength plate QWP and a diameter of which is controlled by an aperture not illustrated, and enters the objective lens OL. Herein, the light flux converged by the central region, the intermediate region, and the peripheral region of the objective lens OL becomes a spot formed on an information recording surface RL1 of the BD through a protective substrate PL1 with a thickness of 0.1 mm.

A reflected light flux modulated by an information pit on the information recording surface RL1 passes through the objective lens OL and the aperture not illustrated again, then the circular polarization of which is converted to the linear polarization by the λ/4 wavelength plate QWP, and the reflected light is made a converging light flux by the collimate lens COL, reflected by the polarization beam splitter BS, and converges on a photo-receiving surface of a photo-receiving element PD through the sensor lens SEN. Then, the information recorded on the BD may be read by focusing and tracking of the objective lens OL by a biaxial actuator AC1 by using an output signal of the photo-receiving element PD. Herein, when fluctuation in wavelength occurs in the first light flux or when recording/reproduction of the BD including a plurality of information recording layers is performed, it is possible to correct a spherical aberration occurring due to the fluctuation in wavelength and different information recording layers by changing a divergence angle or a convergence angle of the light flux entering an objective optical element OL by changing the collimate lens COL as a magnification changing unit in a direction of the optical axis by a uniaxial actuator AC2.

As indicated by a dotted line, the diverging light flux of the second light flux (λ2=660 nm) emitted from the semiconductor laser LD2 of the laser unit LDP is reflected by the dichroic prism DP, passes through the polarization beam splitter BS and the collimate lens COL, the linear polarization of which is converted to the circular polarization by the λ/4 wavelength plate QWP, and enters the objective lens OL. Herein, the light flux converged by the central region and the intermediate region of the objective lens OL (light flux, which passes through the peripheral region, is flared to form a spot peripheral portion) becomes a spot formed on an information recording surface RL2 of the DVD through a protective substrate PL2 with a thickness of 0.6 mm and forms a spot central portion.

The reflected light flux modulated by the information pit on the information recording surface RL2 passes through the objective lens OL again, then the circular polarization of which is converted to the linear polarization by the λ/4 wavelength plate QWP, and the reflected light flux is made the converging light flux by the collimate lens COL, reflected by the polarization beam splitter BS, and converges on the photo-receiving surface of the photo-receiving element PD through the sensor lens SEN. Then, it is possible to read the information recorded on the DVD by using the output signal of the photo-receiving element PD. It is possible to record/reproduce the information on/from the DVD even in a state in which a coupling lens COL is fixed in this embodiment, so that a control system of the optical pickup device is simplified.

As indicated by a dashed line, the diverging light flux of the third light flux (λ3=785 nm) emitted from the semiconductor laser LD3 of the laser unit LDP is reflected by the dichroic prism DP, passes through the polarization beam splitter BS and the collimate lens COL, the linear polarization of which is converted to the circular polarization by the λ/4 wavelength plate QWP, and the diverging light flux enters the objective lens OL. Herein, the light flux converged by the central region of the objective lens OL (light flux, which passes through the intermediate region and the peripheral region, is flared to form the spot peripheral portion) becomes a spot formed on an information recording surface RL3 of the CD through a protective substrate PL3 with a thickness of 1.2 mm.

The reflected light flux modulated by the information pit on the information recording surface RL3 passes through the objective lens OL again, then the circular polarization of which is converted to the linear polarization by the λ/4 wavelength plate QWP, and the reflected light is made the converging light flux by the collimate lens COL, reflected by the polarization beam splitter BS, and converges on the photo-receiving surface of the photo-receiving element PD through the sensor lens SEN. Then, it is possible to read the information recorded on the CD by using the output signal of the photo-receiving element PD.

EXAMPLES

Examples, which may be used in the above-described embodiment, will be hereinafter described. Meanwhile, in a following description (including lens data in table), there is a case in which an exponential in decimal (for example, 2.5× 10-3) is represented by using E (for example, 2.5×E-3). Also, an optical surface of an objective lens is formed into an aspheric surface axisymmetric around an optical axis defined by an equation obtained by substituting a coefficient indicated in a table into equation 1.

$$X(h) = \frac{(h^2/r)}{1 + \sqrt{1 - (1+\kappa)(h/r)^2}} + \sum_{i=0}^{10} A_{2i} h^{2i}$$ [Equation 1]

Where $X(h)$ represents an axis in the optical axis direction (light travels in a positive direction), $\kappa$ represents a constant of the cone, $A_i$ represents an aspherical coefficient, $h$ represents a height from the optical axis, and $r$ represents a paraxial curvature radius.

In a case of an example using a diffraction structure, an optical path difference provided for a light flux at each wavelength by the diffraction structure is defined by an equation obtained by substituting the coefficient indicated in the table into an optical path difference function in equation 2.

$$\Phi(h) = \Sigma(C_{2i} h^{2i} \times \lambda \times m / \lambda B)$$ (Equation 2)

where $\lambda$ represents a wavelength used, $m$ represents a diffraction order, $\lambda B$ represents a manufacturing wavelength, and $h$ represents a distance in a direction perpendicular to the optical axis from the optical axis.

It is assumed that pitch $P(h) = \lambda B / (\Sigma(2i \times C_{2i} \times h^{2i} - 1))$.

Example 1

Figure 10:
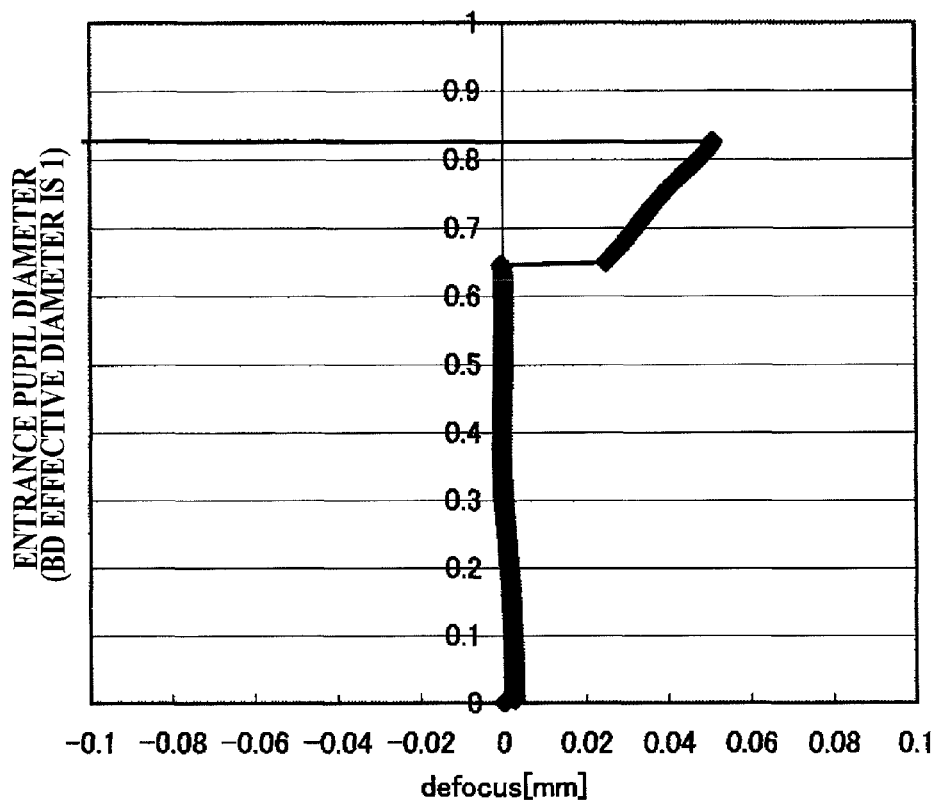
FIG. 10 is a longitudinal spherical aberration diagram when the CD of an Example 1 is used.
Figure 16:
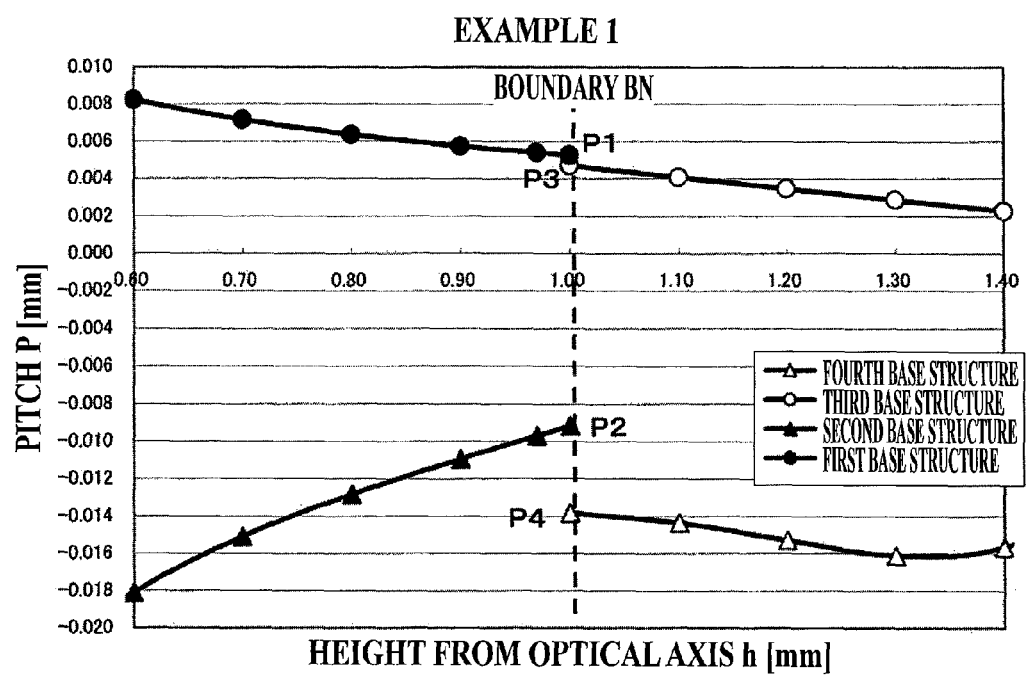
FIG. 16 is a view illustrating a pitch of each base structure in an Example 1.

Lens data of an Example 1 are indicated in tables 1-1 and 1-2. This is an example in which steps of a first base structure and a third base structure face opposite to an optical axis and the steps of a second base structure and a fourth base structure face to the optical axis. A focal distance of a BD is relatively short as 1.77 mm. FIG. 16 illustrates a pitch of each base structure. In FIG. 16, a pitch P (mm) is plotted along the ordinate and a height from the optical axis is plotted along the abscissa and a left side represents a central region and a right side represents an intermediate region across a boundary BN. P1, P2, P3, and P4 are values of the pitches of the first base structure, the second base structure, the third base structure, and the fourth base structure, respectively, closest to the boundary BN. With reference to FIG. 16, it is understood that P1 and P3 are positive values, an absolute value of P1 is larger than that of P3, P2 and P4 are negative values, and an absolute value of P4 is larger than that of P2. Therefore, it is understood that P4−P2<0 and P3−P1<0 are satisfied as indicated in table 6 to be described later. FIG. 10 illustrates a longitudinal spherical aberration diagram when a CD is used in Example 1. As illustrated in FIG. 10, a spherical aberration occurs on an over side on an information recording surface of the CD on an outer side of the intermediate region, so that it is understood that an appropriate flare may be created by this. Further, since the spherical aberration occurs on the over side, a wavefront aberration when a wavelength changed and the wavefront aberration when temperature changed when a DVD is used are made small also as indicated in table 6.

TABLE 1-1

| | Specification | | |
|---|---|---|---|
| | BD | DVD | CD |
| focal distance f (mm) | 1.76 | 1.98 | 2.04 |
| wavelength λ (mm) | 405 | 658 | 785 |
| NA | 0.85 | 0.62 | 0.47 |
| effective diameter φ (mm) | 2.99 | 2.46 | 1.92 |
| magnification | 0 | 0 | 0 |
| WD (mm) | 0.63 | 0.59 | 0.29 |
| disc thickness (mm) | 0.0875 | 0.6 | 1.2 |

| | | Arrangement | | | | | |
|---|---|---|---|---|---|---|---|
| | | BD | | DVD | | CD | | |
| i-th surface | ri | Di (405 nm) | Ni (405 nm) | Di (658 nm) | Ni (658 nm) | Di (785 nm) | Ni (785 nm) | remarks |
| 0 | | ∞ | | ∞ | | ∞ | | |
| 1 (aperture diameter) | ∞ | 0.0 (φ 2.99 mm) | 1.0000 | 0.0 (φ 2.99 mm) | 1.0000 | 0.0 (φ 2.99 mm) | 1.0000 | aperture |
| 2 | see below | 2.00 | 1.5401 | 2.00 | 1.5206 | 2.00 | 1.5172 | objective lens |
| 3 | see below | 0.63 | 1.0000 | 0.59 | 1.0000 | 0.28 | 1.0000 | |
| 4 | ∞ | 0.0875 | 1.6195 | 0.60 | 1.5773 | 1.20 | 1.5706 | disc |
| 5 | ∞ | | | | | | | |

*di represents displacement from (di)th surface to (di + 1)th surface

TABLE 1-2

| | | Aspherical coefficient | | |
|---|---|---|---|---|
| | 2-1st surface | 2-2nd surface | 2-3rd surface | 3rd surface |
| h | 0 ≤ h0.97 | 0.97 ≤ h ≤ 1.24 | 1.24 ≤ h | |
| r | 1.085162055 | 1.123931302 | 1.22131439 | −2.175404278 |
| κ | −5.4038E−01 | −5.0608E−01 | −4.5932E−01 | −2.0881E+01 |
| A4 | −4.0623E−02 | −8.8955E−03 | 3.9176E−02 | 2.1415E−01 |
| A6 | 3.7551E−02 | 1.4213E−02 | 3.4484E−03 | −3.1816E−01 |
| A8 | −2.9900E−02 | −6.0551E−03 | −5.2509E−04 | 3.6280E−01 |
| A10 | 1.3143E−02 | 2.2389E−03 | −1.8865E−03 | −3.0051E−01 |
| A12 | −1.1953E−03 | 8.0341E−04 | −1.0460E−03 | 1.5891E−01 |
| A14 | −4.0264E−03 | −1.2954E−03 | 8.5553E−04 | −4.7214E−02 |
| A16 | −1.8142E−04 | 3.8775E−03 | 2.6350E−05 | 5.9801E−03 |
| A18 | 1.5538E−03 | −3.5012E−03 | 6.4201E−05 | 0.0000E+00 |
| A20 | −1.8053E−04 | 9.2689E−04 | −5.7430E−05 | 0.0000E+00 |
| A0 | 0.0000E+00 | −5.2163E−03 | 9.6180E−03 | 0.0000E+00 |

| | | Optical path difference function coefficient | | |
|---|---|---|---|---|
| | | 2-1st surface | 2-2nd surface $\lambda$B (nm) | 2-3rd surface |
| | order (BD/DVD/CD) | 395 2/1/1 | 395 2/1/1 | 405 1/1/1 |
| diffraction structure 1 | C1 | −1.5056E−02 | −2.0772E−02 | 2.0459E−03 |
| | C2 | −7.4793E−03 | 1.2671E−03 | 6.1055E−03 |
| | C3 | 7.8949E−03 | 1.7334E−03 | 1.4019E−04 |
| | C4 | −4.6609E−03 | −1.8860E−04 | 8.8189E−05 |
| | C5 | 6.8309E−04 | −1.0169E−04 | −3.8522E−04 |

| | | $\lambda$B (nm) | |
|---|---|---|---|
| | order (BD/DVD/CD) | 500 1/1/1 | 500 1/1/1 |
| diffraction structure 2 | C1 | 5.4079E−02 | 4.9867E−02 |
| | C2 | −6.7456E−03 | −1.7988E−03 |
| | C3 | 4.3356E−03 | 3.2582E−03 |
| | C4 | −1.8311E−03 | −1.3972E−03 |
| | C5 | 2.2692E−04 | 5.4497E−04 |

Diffraction structure 1 of 2-1st surface is second base structure
Diffraction structure 2 of 2-1st surface is first base structure
Diffraction structure 1 of 2-2nd surface is fourth base structure
Diffraction structure 2 of 2-2nd surface is third base structure Example 2

Figure 11:
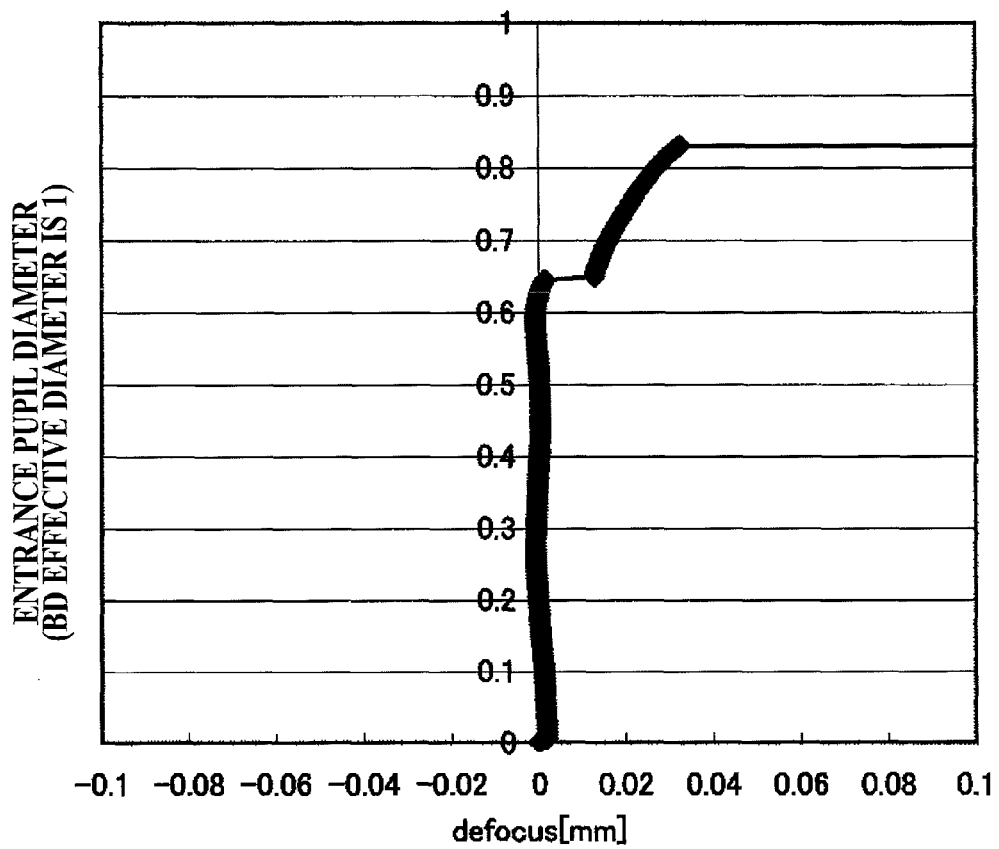
FIG. 11 is a longitudinal spherical aberration diagram when the CD of an Example 2 is used.

Lens data of an Example 2 are indicated in tables 2-1 and 2-2. This is an example in which steps of a first base structure and a third base structure face opposite to an optical axis and the steps of a second base structure and a fourth base structure face to the optical axis. A focal distance of a BD is relatively short as 1.77 mm. As indicated in table 6 to be described later, P4−P2<0 and P3−P1<0 are satisfied. FIG. 11 illustrates a longitudinal spherical aberration diagram when a CD is used in Example 2. As illustrated in FIG. 11, a spherical aberration occurs on an over side on an information recording surface of the CD on an outer side of an intermediate region, so that it is understood that an appropriate flare may be created by this. Further, since the spherical aberration occurs on the over side, it is understood that a wavefront aberration when a wavelength changed and the wavefront aberration when temperature changed when a DVD is used are made small also as indicated in table 6.

TABLE 2-1

| | Specification | | |
|---|---|---|---|
| | BD | DVD | CD |
| focal distance f (mm) | 1.77 | 2.00 | 2.05 |
| wavelength $\lambda$ (mm) | 405 | 660 | 785 |
| NA | 0.85 | 0.62 | 0.47 |
| effective diameter $\phi$ (mm) | 3.00 | 2.48 | 1.92 |
| Magnification | 0 | 0 | 0 |
| WD (mm) | 0.61 | 0.57 | 0.25 |
| disc thickness (mm) | 0.0875 | 0.6 | 1.2 |

TABLE 2-1-continued

| | | Arrangement | | | | | | |
|---|---|---|---|---|---|---|---|---|
| | | BD | | DVD | | CD | | |
| i-th surface | ri | di (405 nm) | ni (405 nm) | di (660 nm) | ni (660 nm) | di (785 nm) | ni (785 nm) | remarks |
| 0 | ∞ | | | | | | | |
| 1 (aperture diameter) | ∞ | 0.0 (φ 3.00 mm) | 1.0000 | 0.0 (φ 3.00 mm) | 1.0000 | 0.0 (φ 3.00 mm) | 1.0000 | aperture |
| 2 | see below | 2.00 | 1.5401 | 2.00 | 1.5206 | 2.00 | 1.5172 | objective lens |
| 3 | see below | 0.61 | 1.0000 | 0.57 | 1.0000 | 0.25 | 1.0000 | |
| 4 | ∞ | 0.0875 | 1.6195 | 0.60 | 1.5772 | 1.20 | 1.5706 | disc |
| 5 | ∞ | | | | | | | |

*di represents displacement from (di)th surface to (di + 1)th surface

TABLE 2-2

| | Aspherical coefficient | | | |
|---|---|---|---|---|
| | 2-1st surface | 2-2nd surface | 2-3rd surface | 3rd surface |
| h | 0 ≤ h ≤ 0.97 | 0.97 ≤ h ≤ 1.50 | 1.24 ≤ h | |
| r | 1.138927939 | 1.175175733 | 1.242096514 | |
| κ | −4.6160E−01 | −5.2557E−01 | −4.9822E−01 | −3.7058E+01 |
| A4 | −1.8706E−02 | −4.3626E−03 | 2.4747E−02 | 1.8422E−01 |
| A6 | 2.2086E−02 | 1.9780E−02 | 1.2785E−03 | −2.9917E−01 |
| A8 | −3.7558E−02 | −5.5175E−03 | 1.2793E−03 | 3.6266E−01 |
| A10 | 1.1739E−02 | −5.4060E−04 | −1.4227E−03 | −3.0465E−01 |
| A12 | 6.8863E−03 | −1.7297E−03 | −1.1106E−03 | 1.5832E−01 |
| A14 | −8.8093E−03 | −1.9743E−03 | 7.4546E−04 | −4.5266E−02 |
| A16 | 7.8663E−03 | 5.0350E−03 | 9.9106E−06 | 5.4228E−03 |
| A18 | −2.3567E−03 | −2.6044E−03 | 7.4250E−05 | 0.0000E+00 |
| A20 | −1.8054E−04 | 4.2221E−04 | −3.9919E−05 | 0.0000E+00 |
| A0 | 0.0000E+00 | 2.8045E−03 | 2.3021E−02 | 0.0000E+00 |

| | Optical Path Difference Function Coefficient | | | |
|---|---|---|---|---|
| | | 2-1st surface | 2-2nd surface | 2-3rd surface |
| | | | λB (nm) | |
| | order (BD/DVD/CD) | 395 2/1/1 | 395 2/1/1 | 405 1/1/1 |
| diffraction structure 1 | C1 | −2.2290E−02 | −2.4079E−02 | −1.0851E−04 |
| | C2 | −4.7588E−04 | 3.7069E−04 | −4.5307E−03 |
| | C3 | −7.4350E−04 | 3.4303E−04 | −2.4546E−03 |
| | C4 | −3.2357E−03 | −1.0413E−03 | 3.8722E−04 |
| | C5 | 2.1779E−03 | 3.3334E−04 | 2.1446E−04 |

| | | λB (nm) | |
|---|---|---|---|
| | order (BD/DVD/CD) | 500 1/1/1 | 500 1/1/1 |
| diffraction structure 2 | C1 | 5.1214E−02 | 4.8849E−02 |
| | C2 | −9.5918E−03 | −2.9587E−03 |
| | C3 | 1.5804E−02 | 3.2317E−03 |
| | C4 | −1.5831E−02 | −1.4102E−03 |
| | C5 | 6.1057E−03 | 3.5601E−04 |

Diffraction structure 1 of 2-1st surface is second base structure
Diffraction structure 2 of 2-1st surface is first base structure
Diffraction structure 1 of 2-2nd surface is fourth base structure
Diffraction structure 2 of 2-2nd surface is third base structure Example 3

Figure 12:
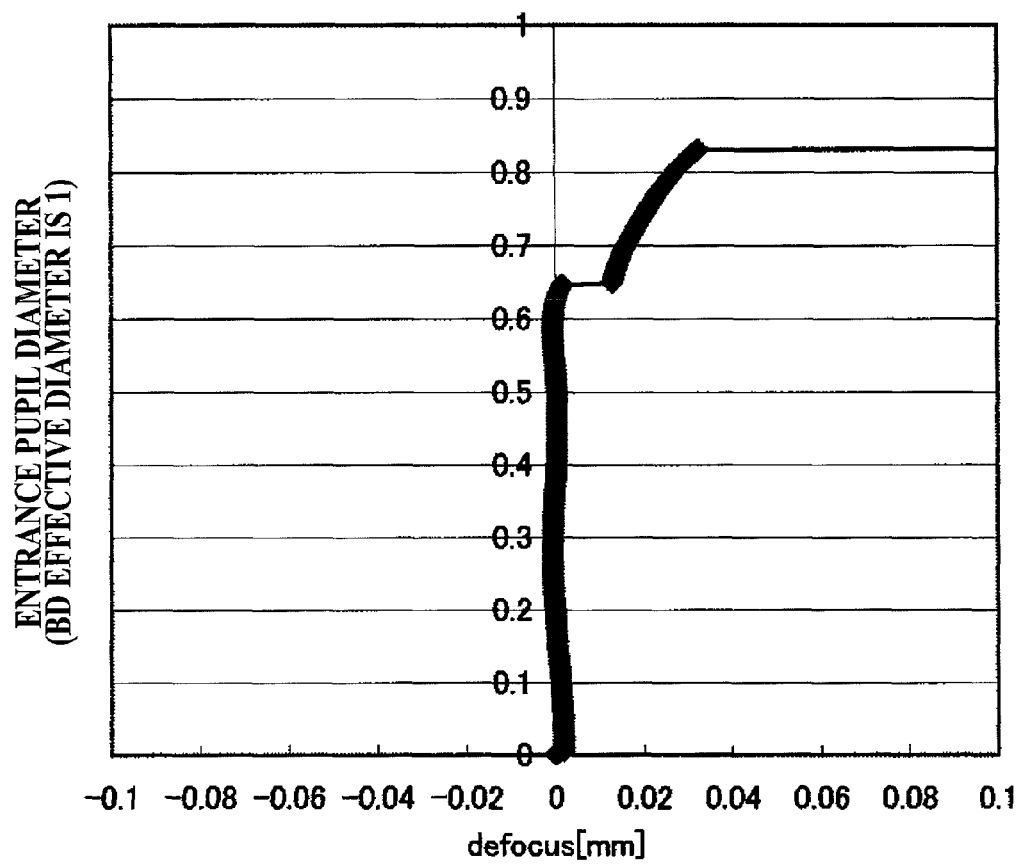
FIG. 12 is a longitudinal spherical aberration diagram when the CD of an Example 3 is used.
Figure 17:
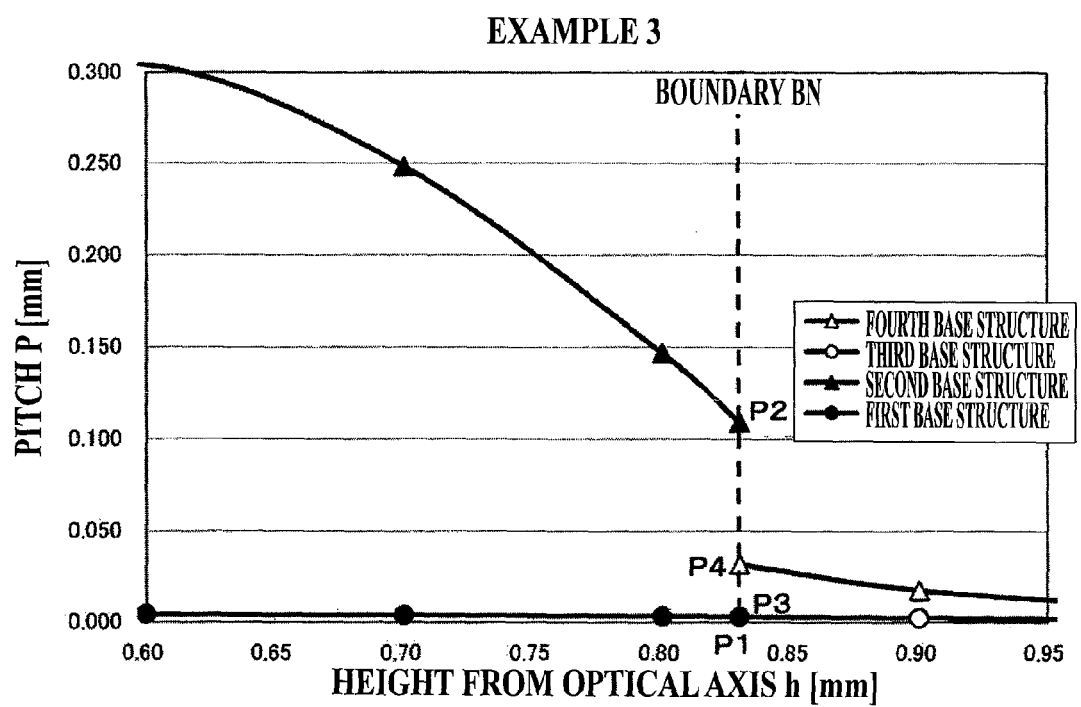
FIG. 17 is a view illustrating a pitch of each base structure in an Example 3.

Lens data of Example 3 are indicated in tables 3-1 and 3-2. In this Example, steps of a first base structure and a third base structure face opposite to an optical axis and the steps of a second base structure and a fourth base structure also face opposite to the optical axis. A focal distance of a BD is very short as 1.41 mm. FIG. 17 illustrates a pitch of each base structure. With reference to FIG. 17, it is understood that P1 and P3 are positive values, an absolute value of P1 is larger than that of P3, P2 and P4 also are positive values, and an absolute value of P2 is larger than that of P4. Therefore, it is understood that P4−P2<0 and P3−P1<0 are satisfied also as indicated in table 6 to be described later. FIG. 12 illustrates a longitudinal spherical aberration diagram when a CD is used in Example 3. As illustrated in FIG. 12, a spherical aberration occurs on an over side on an information recording surface of the CD on an outer side of an intermediate region, so that it is understood that an appropriate flare may be created by this. Further, since the spherical aberration occurs on the over side, it is understood that a wavefront aberration when a wavelength changed and the wavefront aberration when temperature changed when the DVD is used are made small also as indicated in table 6.

TABLE 3-1

| Specification | | BD | DVD | CD |
|---|---|---|---|---|
| focal distance f (mm) | | 1.41 | 1.60 | 1.71 |
| wavelength λ (mm) | | 405 | 658 | 785 |
| NA | | 0.65 | 0.6 | 0.47 |
| effective diameter φ (mm) | | 2.40 | 2.00 | 1.66 |
| Magnification | | 0 | −0.0231 | −0.0247 |
| WD (mm) | | 054 | 0.53 | 0.33 |
| disc thickness (mm) | | 0.0875 | 0.6 | 1.2 |

| Arrangement | | | | | | | |
|---|---|---|---|---|---|---|---|
| | | BD | | DVD | | CD | |
| i-th surface | ri | di (405 nm) | ni (405 nm) | di (658 nm) | ni (658 nm) | di (785 nm) | ni (785 nm) | remarks |
| 0 | | ∞ | | 70.00 | | 70.00 | | |
| 1 (aperture diameter) | ∞ | 0.0 (φ 2.40 mm) | 1.0000 | 0.0 (φ 2.40 mm) | 1.0000 | 0.0 (φ 2.40 mm) | 1.0000 | aperture |
| 2 | see below | 1.65 | 1.5401 | 1.65 | 1.5206 | 1.65 | 1.5172 | objective lens |
| 3 | see below | 0.54 | 1.0000 | 0.53 | 1.0000 | 0.33 | 1.0000 | |
| 4 | ∞ | 0.0875 | 1.6195 | 0.60 | 1.5773 | 1.20 | 1.5706 | disc |
| 5 | ∞ | | | | | | | |

*di represents displacement from (di)th surface to (di + 1)th surface

TABLE 3-2

| Aspherical coefficient | | | | |
|---|---|---|---|---|
| | 2-1st surface | 2-2nd surface | 2-3rd surface | 3rd surface |
| h | 0 ≤ h ≤ 0.83 | 0.83 ≤ h ≤ 1.00 | 1.00 ≤ h | |
| r | 0.723711529 | 0.650926908 | 0.691056991 | −1.367556993 |
| κ | −7.3107E−01 | −8.3286E−01 | −8.0085E−01 | −1.1949E+01 |
| A4 | −1.6558E−01 | −2.8317E−01 | −20885E−01 | 4.4812E−01 |
| A6 | 3.0053E−01 | 2.8456E−01 | 2.9753E−01 | −1.0415E+00 |
| A8 | −2.6991E−01 | −7.9391E−02 | −1.1658E−01 | 1.8303E+00 |
| A10 | 7.3580E−02 | 1.1062E−01 | 7.9459E−02 | −2.3100E+00 |
| A12 | 1.2216E−01 | −8.1174E−02 | −7.445E−02 | 1.9673E+00 |
| A14 | −1.7787E−01 | −6.1827E−02 | −5.2640E−02 | −9.6398E−01 |
| A16 | 1.8212E−01 | 1.4534E−01 | 1.6274E−01 | 1.9942E−01 |
| A18 | −1.1949E−01 | −7.6957E−02 | −1.2870E−01 | 0.0000E+00 |
| A20 | 4.4331E−02 | 1.4791E−02 | 3.5835E−02 | 0.0000E+00 |
| A0 | 0.0000E+00 | −1.4620E−02 | 6.0376E−03 | 0.0000E+00 |

| Optical path difference function coefficient | | | |
|---|---|---|---|
| | 2-1st surface | 2-2nd surface λB (nm) | 2-3rd surface |
| order (BD/DVD/CD) | 395 2/1/1 | 395 2/1/1 | 405 1/1/1 |
| diffraction structure 1 C1 | 8.1203E−03 | 9.3640E−03 | 1.2499E−01 |
| C2 | −3.0167E−02 | −3.6173E−02 | −1.2512E−01 |
| C3 | 6.4945E−02 | 5.8067E−02 | 1.6392E−01 |

TABLE 3-2-continued

|  |  |  |  |
|---|---|---|---|
| C4 | −7.1038E−02 | −3.7038E−02 | −6.6434E−02 |
| C5 | 3.2020E−02 | 1.2184E−02 | −2.0635E−03 |

|  |  | $\lambda B$ (nm) | |
|---|---|---|---|
|  | order (BD/DVD/CD) | 500 1/1/1 | 500 1/1/1 |
| diffraction structure 2 | C1 | 1.0494E−01 | 1.0924E−01 |
|  | C2 | −3.6561E−02 | −4.5912E−02 |
|  | C3 | 5.0577E−02 | 3.8125E−02 |
|  | C4 | −3.6509E−02 | −1.0857E−03 |
|  | C5 | 1.6268E−02 | −5.0346E−04 |

Diffraction structure 1 of 2-1st surface is second base structure
Diffraction structure 2 of 2-1st surface is first base structure
Diffraction structure 1 of 2-2nd surface is fourth base structure
Diffraction structure 2 of 2-2nd surface is third base structure

Example 4

Figure 13:
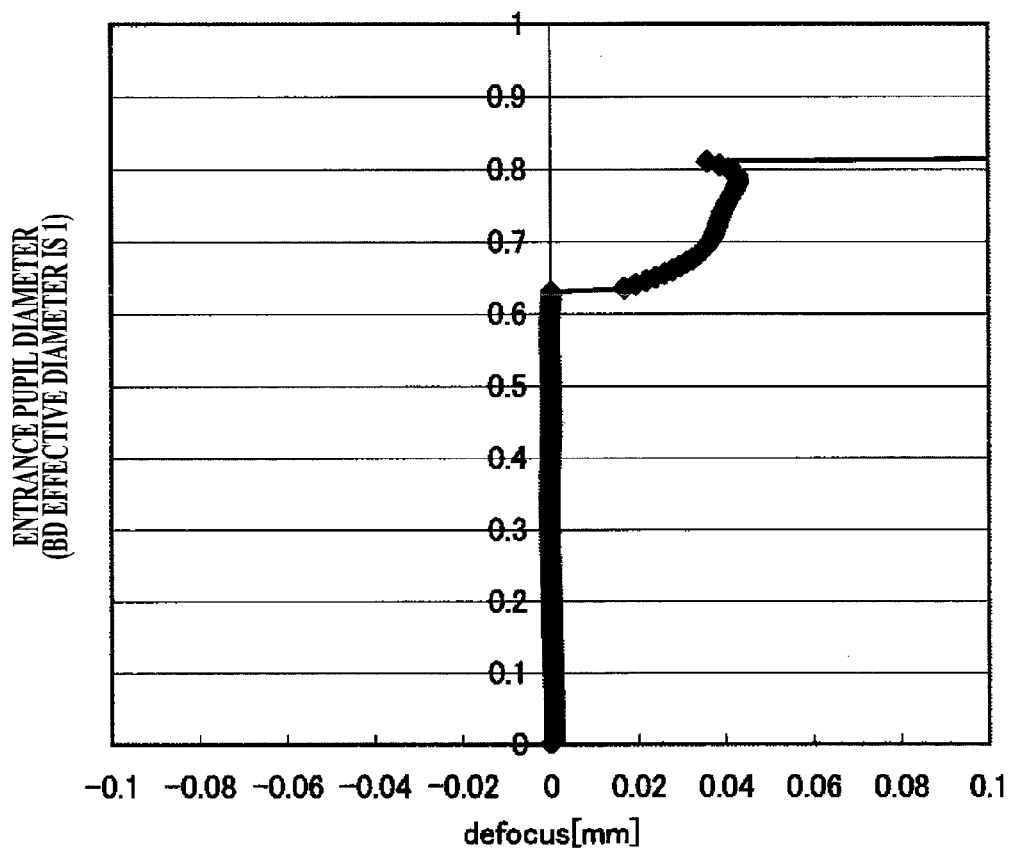
FIG. 13 is a longitudinal spherical aberration diagram when the CD of an Example 4 is used.
Figure 14A:
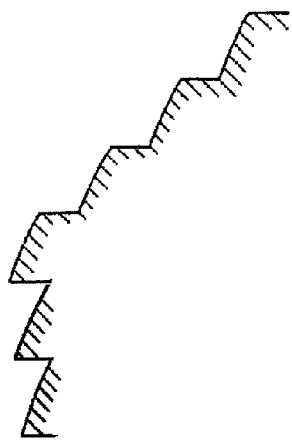
FIG. 14A is a view illustrating a shape in which the step faces to an optical axis in the vicinity of the optical axis but this is switched in midstream and the step faces opposite to the optical axis in the vicinity of an intermediate region.
Figure 14B:
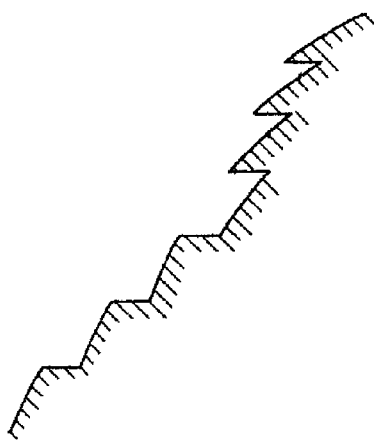
FIG. 14B is a view illustrating a shape in which the step faces opposite to an optical axis in the vicinity of the optical axis but this is switched in midstream and the step faces to the optical axis in the vicinity of an intermediate region.

Lens data of an Example 4 are indicated in tables 4-1 and 4-2. In this Example, steps of a first base structure and a third base structure face opposite to an optical axis and the steps of a second base structure and a fourth base structure face to the optical axis. A focal distance of a BD is 2.2 mm and this is herein considered to be a relatively short value. As indicated in table 6 to be described later, $P4-P2<0$ and $P3-P1<0$ are satisfied. FIG. 13 illustrates a longitudinal spherical aberration diagram when a CD is used in Example 4. As illustrated in FIG. 13, the spherical aberration occurs on an over side on an information recording surface of the CD on an outer side of the intermediate region, so that it is understood that an appropriate flare may be created by this. Further, since the spherical aberration occurs on the over side, it is understood that a wavefront aberration when a wavelength changes and the wavefront aberration when temperature changes when a DVD is used are made small also as indicated in table 6.

TABLE 4-1

| | Specification | | |
|---|---|---|---|
| | BD | DVD | CD |
| focal distance f (mm) | 2.20 | 2.41 | 2.48 |
| wavelength $\lambda$ (mm) | 405 | 660 | 785 |
| NA | 0.85 | 0.62 | 0.47 |
| effective diameter $\phi$ (mm) | 3.74 | 3.04 | 2.36 |
| magnification | 0 | 0 | 0 |
| WD (mm) | 0.77 | 0.71 | 0.41 |
| disc thickness (mm) | 0.0875 | 0.6 | 1.2 |

| | | Arrangement | | | | | |
|---|---|---|---|---|---|---|---|
| | | BD | | DVD | | CD | |
| i-th surface | ri | di (405 nm) | ni (405 nm) | di (660 nm) | ni (660 nm) | di (785 nm) | ni (785 nm) remarks |
| 0 | | ∞ | | ∞ | | ∞ | |
| 1 (aperture diameter) | ∞ | 0.0 ($\phi$ 3.74 mm) | 1.0000 | 0.0 ($\phi$ 3.74 mm) | 1.0000 | 0.0 ($\phi$ 3.74 mm) | 1.0000 aperture |
| 2 | see below | 2.50 | 1.5401 | 2.50 | 1.5206 | 2.50 | 1.5172 objective lens |
| 3 | see below | 0.77 | 1.0000 | 0.71 | 1.0000 | 0.41 | 1.0000 |
| 4 | ∞ | 0.0875 | 1.6195 | 0.60 | 1.5772 | 1.20 | 1.5706 disc |
| 5 | ∞ | | | | | | |

*di represents displacement from (di)th surface to (di + 1)th surface

TABLE 4-2

| | | Aspherical Coefficient | | |
|---|---|---|---|---|
| | 2-1st surface | 2-2nd surface | 2-3rd surface | 3rd surface |
| h | $0 \leq h \leq 1.18$ | $1.18 \leq h \leq 1.52$ | $1.52 \leq h$ | |
| r | 1.314432065 | 1.332742235 | 1.47646313 | −2.91063962 |
| κ | −4.0123E−01 | −5.7045E−01 | −4.3155E−01 | −1.8496E+01 |
| A4 | −2.2259E−02 | −2.3343E−02 | 2.3979E−02 | 1.2347E−01 |
| A6 | 8.3199E−03 | 3.9164E−02 | −2.2073E−03 | −1.0585E−01 |
| A8 | −8.6461E−03 | −1.8396E−02 | 2.7833E−04 | 7.6842E−02 |
| A10 | 6.7717E−04 | −2.1415E−03 | −4.8435E−04 | −4.0854E−02 |
| A12 | 2.2364E−03 | 5.0346E−03 | −1.0060E−04 | 1.3816E−02 |
| A14 | −2.5426E−03 | −2.6492E−03 | 5.1692E−05 | −2.5598E−03 |
| A16 | 1.8677E−03 | 1.8889E−03 | −8.0194E−07 | 1.9956E−04 |
| A18 | −8.7600E−04 | −8.6927E−04 | 1.2797E−06 | 0.0000E+00 |
| A20 | 1.7989E−04 | 1.3876E−04 | −7.3461E−07 | 0.0000E+00 |
| A0 | 0.0000E+00 | −8.0654E−03 | 3.6147E−02 | 0.0000E+00 |

| | | Optical path difference function coefficient | | |
|---|---|---|---|---|
| | | 2-1st surface | 2-2nd surface | 2-3rd surface |
| | | | λB (nm) | |
| | order (BD/DVD/CD) | 395 2/1/1 | 395 2/1/1 | 405 1/1/1 |
| diffraction structure 1 | C1 | −5.8519E−03 | −6.7293E−03 | 1.6580E−02 |
| | C2 | −3.3057E−03 | 8.8231E−03 | 1.2423E−03 |
| | C3 | 3.3309E−03 | 9.5805E−03 | −8.5004E−04 |
| | C4 | −2.3726E−03 | −3.3863E−03 | −1.1367E−04 |
| | C5 | 6.3295E−04 | 4.0874E−04 | −5.3495E−05 |
| | | | λB (nm) | |
| | order (BD/DVD/CD) | | 500 1/1/1 | 500 1/1/1 |
| diffraction structure 2 | C1 | | 3.0864E−02 | 3.4509E−02 |
| | C2 | | −8.0257E−04 | −8.0512E−03 |
| | C3 | | −3.6309E−04 | 2.8499E−03 |
| | C4 | | 1.9790E−04 | 5.9261E−04 |
| | C5 | | −8.9109E−05 | −2.8811E−04 |

Diffraction structure 1 of 2-1st surface is second base structure
Diffraction structure 2 of 2-1st surface is first base structure
Diffraction structure 1 of 2-2nd surface is fourth base structure
Diffraction structure 2 of 2-2nd surface is third base structure Example 5

Figure 15:
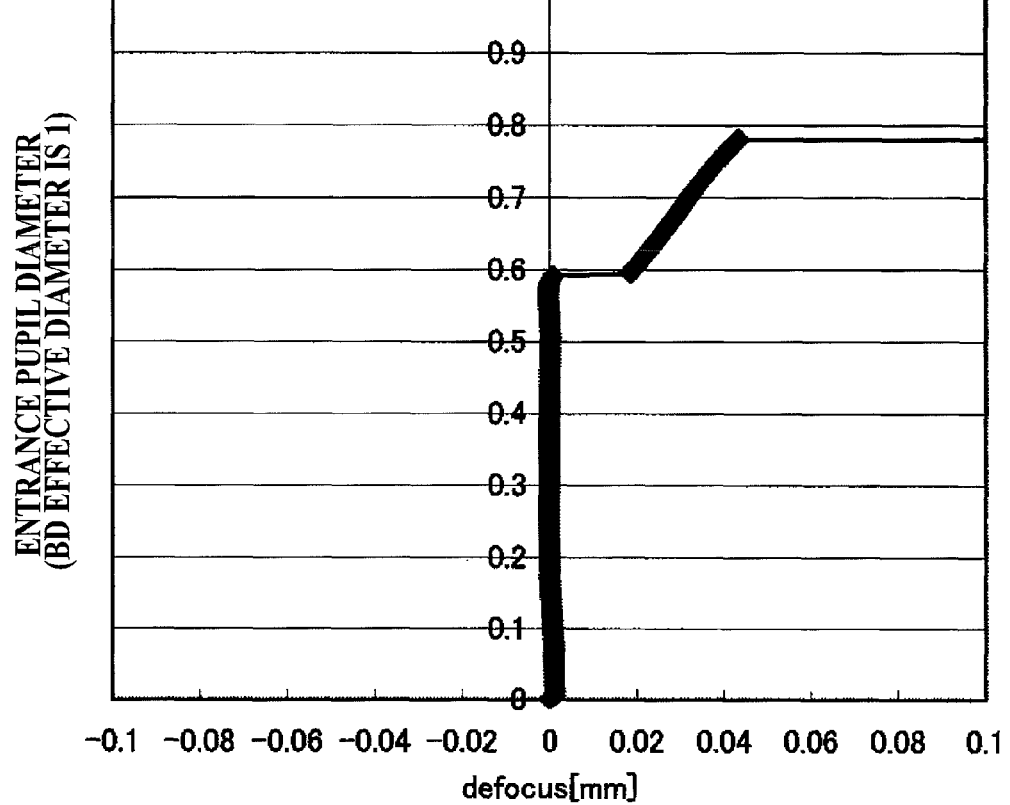
FIG. 15 is a longitudinal spherical aberration diagram when the CD of an Example 5 is used.
Figure 18:
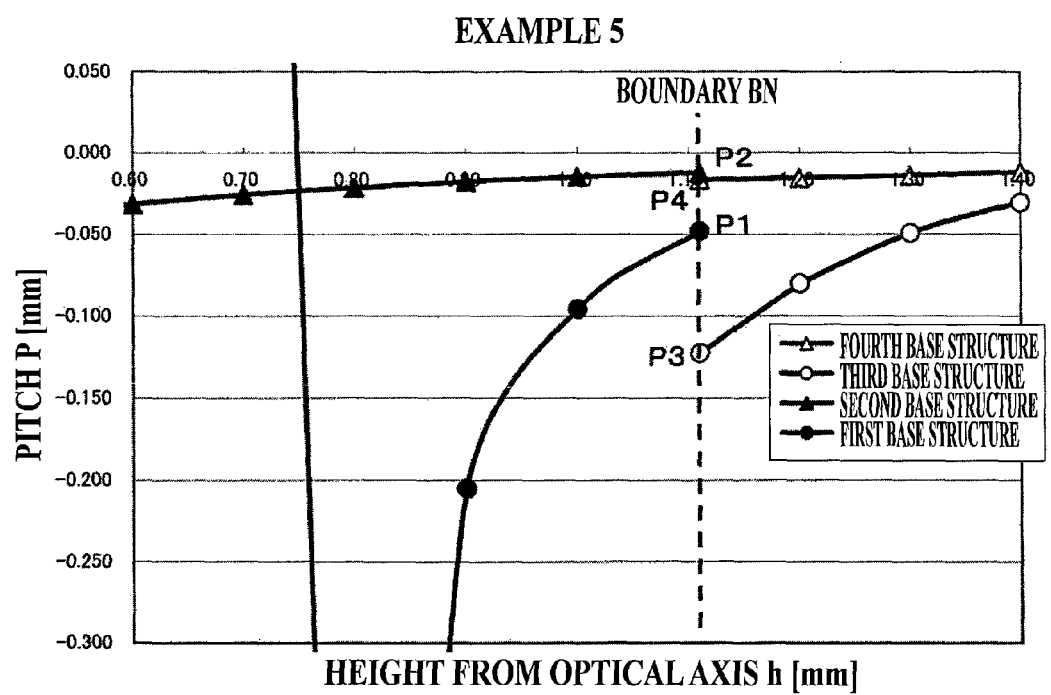
FIG. 18 is a view illustrating a pitch of each base structure in an Example 5.

Lens data of an Example 5 are indicated in tables 5-1 and 5-2. This is an example in which steps of a first base structure and a third base structure face to an optical axis and the steps of a second base structure and a fourth base structure also face to the optical axis. A focal distance of a BD is 2.2 mm and this is herein considered to be a relatively long value. Meanwhile, the focal distance is divided into parts represented as very short, relatively short, relatively long in this description, a boundary thereof is not strict and they partly overlap. In a region in which the parts of the focal distance overlap, the direction of the step might differ according to a design with the same focal distance. FIG. 18 illustrates a pitch of each base structure. With reference to FIG. 18, it is understood that P1 and P3 are negative values, an absolute value of P3 is larger than that of P1, P2 and P4 also are the negative values, and an absolute value of P4 is larger than that of P2. Therefore, it is understood that P4−P2<0 and P3−P1<0 are satisfied also as indicated in table 6 to be described later. FIG. 15 illustrates a longitudinal spherical aberration diagram when a CD is used in Example 5. As illustrated in FIG. 15, a spherical aberration occurs on an over side on an information recording surface of the CD on an outer side of an intermediate region, so that it is understood that an appropriate flare may be created by this. Further, since the spherical aberration occurs on the over side, it is understood that a wavefront aberration when a wavelength changes and the wavefront aberration when temperature changes when a DVD is used are made small also as indicated in table 6.

TABLE 5-1

| | Specification | | |
|---|---|---|---|
| | BD | DVD | CD |
| focal distance f (mm) | 2.20 | 2.30 | 2.30 |
| wavelength λ (mm) | 405 | 660 | 785 |

TABLE 5-1-continued

|   | | | |
|---|---|---|---|
| NA | 0.85 | 0.62 | 0.47 |
| effective diameter φ (mm) | 3.74 | 2.04 | 1.70 |
| magnification | 0 | −0.0234 | −0.0234 |
| WD (mm) | 0.77 | 0.60 | 0.21 |
| disc thickness (mm) | 0.0875 | 0.6 | 1.2 |

| | | Arrangement | | | | | |
|---|---|---|---|---|---|---|---|
| | | BD | | DVD | | CD | |
| i-th surface | ri | di (405 nm) | ni (405 nm) | di (660 nm) | ni (660 nm) | di (785 nm) | ni (785 nm) | remarks |
| 0 | | ∞ | | ∞ | | ∞ | | |
| 1 (aperture diameter) | ∞ | 0.0 (φ 2.40 mm) | 1.0000 | 0.0 (φ 3.74 mm) | 1.0000 | 0.0 (φ 2.40 mm) | 1.0000 | aperture |
| 2 | see below | 2.40 | 1.5401 | 2.40 | 1.5206 | 2.40 | 1.5172 | objective lens |
| 3 | see below | 0.77 | 1.0000 | 0.60 | 1.0000 | 0.21 | 1.0000 | |
| 4 | ∞ | 0.0875 | 1.6195 | 0.60 | 1.5772 | 1.20 | 1.5706 | disc |
| 5 | ∞ | | | | | | | |

*di represents displacement from (di)th surface to (di + 1)th surface

TABLE 5-2

| | Aspherical coefficient | | | |
|---|---|---|---|---|
| | 2-1st surface | 2-2nd surface | 2-3rd surface | 3rd surface |
| h | 0 ≤ h ≤ 1.11 | 1.11 ≤ h ≤ 1.48 | 1.48 ≤ h | |
| r | 1.461768498 | 1.445779868 | 1.534631448 | −3.754214841 |
| κ | −6.5163E−01 | −6.4100E−01 | −4.9772E−01 | −4.1018E+01 |
| A4 | −5.6682E−03 | −3.9046E−02 | 1.5892E−02 | 1.1141E−01 |
| A6 | 9.0047E−03 | 4.3262E−02 | −2.9238E−03 | −1.0945E−01 |
| A8 | −4.8874E−03 | −1.3910E−02 | 4.0777E−04 | 7.6241E−02 |
| A10 | 2.1531E−04 | −6.8884E−04 | −3.8547E−04 | −4.1087E−02 |
| A12 | 1.9495E−04 | 3.8277E−03 | −6.2782E−05 | 1.4010E−02 |
| A14 | −1.7298E−03 | −3.6705E−03 | 6.1539E−05 | −2.5596E−03 |
| A16 | 2.6460E−03 | 1.9986E−03 | 7.2681E−07 | 1.8101E−04 |
| A18 | −8.2921E−04 | −5.5740E−04 | 1.0753E−06 | 0.0000E+00 |
| A20 | 7.4856E−05 | 6.2305E−05 | −1.0618E−06 | 0.0000E+00 |
| A0 | 0.0000E+00 | −1.2835E−03 | −4.5324E−03 | 0.0000E+00 |

| | Optical path difference function coefficient | | | |
|---|---|---|---|---|
| | | 2-1st surface | 2-2nd surface | 2-3rd surface |
| | | | λB (nm) | |
| | order (BD/DVD/CD) | 395 2/1/1 | 395 2/1/1 | 405 1/1/1 |
| diffraction structure 1 | C1 | −8.5214E−03 | −8.7778E−03 | 0.0000E+00 |
| | C2 | −4.4048E−03 | −8.7356E−03 | 0.0000E+00 |
| | C3 | 5.1730E−03 | 8.9736E−03 | 0.0000E+00 |
| | C4 | −4.6471E−03 | −3.6324E−03 | 0.0000E+00 |
| | C5 | 1.4028E−03 | 5.0488E−04 | 0.0000E+00 |

| | | λB (nm) | |
|---|---|---|---|
| | order (BD/DVD/CD) | 500 1/1/1 | 500 1/1/1 |
| diffraction structure 2 | C1 | 2.4691E−03 | 1.8569E−03 |
| | C2 | −9.2847E−04 | −3.9483E−03 |
| | C3 | −2.6232E−03 | 3.0655E−03 |
| | C4 | 2.0870E−03 | −1.3061E−03 |
| | C5 | −7.4018E−04 | 1.6015E−04 |

Diffraction structure 1 of 2-1st surface is second base structure
Diffraction structure 2 of 2-1st surface is first base structure
Diffraction structure 1 of 2-2nd surface is fourth base structure
Diffraction structure 2 of 2-2nd surface is third base structure Values of condition equations described in claims are collectively indicated in table 6.

TABLE 6

|  | Example 1 | Example 2 | Example 3 | Example 4 | Example 5 |
|---|---|---|---|---|---|
| flare | over | over | over | over | over |
| PW4 | 0.08 | 0.08 | 0.17 | 0.05 | 0.00 |
| PW3 | −0.04 | −0.05 | 0.02 | −0.01 | −0.02 |
| PW2 | 0.08 | 0.08 | 0.16 | 0.05 | 0.00 |
| PW1 | −0.03 | −0.04 | 0.02 | −0.01 | −0.02 |
| P1 | 5.40E−03 | 5.56E−03 | 3.10E−03 | 7.85E−03 | −4.81E−02 |
| P2 | −9.69E−03 | −7.43E−03 | 1.09E−01 | −1.78E−01 | −1.23E−02 |
| P3 | 4.90E−03 | 5.31E−03 | 2.98E−03 | 7.15E−03 | −1.23E−01 |
| P4 | −1.37E−02 | −8.27E−02 | 3.18E−02 | −3.75E−02 | −1.65E−02 |
| (1) P4 − P2 < 0 | −4.01E−03 | −8.40E−04 | −7.73E−02 | −1.97E−02 | −4.14E−02 |
| (2) P3 − P1 < 0 | −5.00E−04 | −2.50E−04 | −1.22E−04 | −7.07E−04 | −7.44E−04 |
| BD focal distance f1 [mm] | 1.77 | 1.77 | 1.41 | 2.20 | 2.20 |
| (12) (PW1/PW3)/(PW2/PW4) | 0.67 | 0.88 | 0.90 | 0.97 | 0.73 |
| (13) d/f1 | 1.13 | 1.13 | 1.17 | 1.14 | 1.09 |
| wavefront aberration when wavelength changed (+5 nm, 25° C.) in DVD | 0.013 λrms | 0.009 λrms | 0.008 λrms | 0.012 λrms | 0.008 λrms |
| wavefront aberration when wavelength changed (+6 nm, 55° C.) in DVD | 0.021 λrms | 0.010 λrms | 0.010 λrms | 0.020 λrms | 0.011 λrms |
| direction of step of first base station on boundary between central region and intermediate region | direction opposite to optical axis | direction opposite to optical axis | direction opposite to optical axis | direction opposite to optical axis | direction to optical axis |
| direction of step of second base station on boundary between central region and intermediate region | direction to optical axis | direction to optical axis | direction opposite to optical axis | direction to optical axis | direction to optical axis |
| direction of step of third base station on boundary between central region and intermediate region | direction opposite to optical axis | direction opposite to optical axis | direction opposite to optical axis | direction opposite to optical axis | direction to optical axis |
| direction of step of fourth base station on boundary between central region and intermediate region | direction to optical axis | direction to optical axis | direction opposite to optical axis | direction to optical axis | direction to optical axis | sign of P is + . . . direction opposite to optical axis
sign of P is − . . . direction to optical axis The present invention is not limited to Examples in the description and it is clear for one skilled in the art in this field that another example and variation are included therein from the example and the spirit described in the present description. The description and the examples in the description are illustrative only and the scope of the present invention is described in following claims.

The entire disclosure of Patent Application No. 2010-219212 in Japanese filed on Sep. 29, 2010 including the description, claims, the drawings, and the abstract is incorporated as a part of this application.

Industrial Applicability

As described above, the present invention is suitable for the optical pickup device capable of compatibly recording and/or reproducing (record/reproduction) the information on/from the optical discs of the different types and the objective lens.

Reference Signs List

AC1 biaxial actuator
BS polarization beam splitter
CN central region
COL collimate lens
DP dichroic prism
LD1 first semiconductor laser or blue-violet semiconductor laser
LD2 second semiconductor laser
LD3 third semiconductor laser
LDP laser unit
MD intermediate region
OL objective lens
OT peripheral region
PD photo-receiving element
PL1 protective substrate
PL2 protective substrate
PL3 protective substrate
PU1 optical pickup device
QWP λ/4 wavelength plate
RL1 information recording surface
RL2 information recording surface
RL3 information recording surface
SEN sensor lens

The invention claimed is:

1. An objective lens used in an optical pickup device, the optical pickup device comprising a first light source which emits a first light flux at a first wavelength λ1 (nm), a second light source which emits a second light flux at a second wavelength λ2 (nm) wherein λ2>λ1, and a third light source which emits a third light flux at a third wavelength λ3 (nm) wherein λ3>λ2 for recording and/or reproducing information of a first optical disc comprising a protective substrate with a thickness of t1 by using the first light flux, recording and/or reproducing information of a second optical disc comprising a protective substrate with a thickness of t2 wherein t1<t2 by using the second light flux, and recording and/or reproducing information of a third optical disc comprising a protective substrate with a thickness of t3 wherein t2<t3 by using the third light flux, and the objective lens comprising an optical surface:

wherein the objective lens is a single lens, the optical surface comprises at least a central region, an intermediate region around the central region, and a peripheral region around the intermediate region, the objective lens converges the first light flux, which passes through the central region, on an information recording surface of the first optical disc such that the information is recorded and/or reproduced, converges the second light flux, which passes through the central region, on an information recording surface of the second optical disc such that the information is recorded and/or reproduced, and converges the third light flux, which passes through the central region, on an information recording surface of the third optical disc such that the information is recorded and/or reproduced, the objective lens converges the first light flux, which passes through the intermediate region, on the information recording surface of the first optical disc such that the information is recorded and/or reproduced, converges the second light flux, which passes through the intermediate region, on the information recording surface of the second optical disc such that the information is recorded and/or reproduced, and does not converge the third light flux, which passes through the intermediate region, on the information recording surface of the third optical disc such that the information is recorded and/or reproduced, the objective lens converges the first light flux, which passes through the peripheral region, on the information recording surface of the first optical disc such that the information is recorded and/or reproduced, does not converge the second light flux, which passes through the peripheral region, on the information recording surface of the second optical disc such that the information is recorded and/or reproduced, and does not converge the third light flux, which passes through the peripheral region on the information recording surface of the third optical disc such that the information is recorded and/or reproduced, the central region comprises a first optical path difference providing structure obtained by superimposing a first base structure, which is a blazed structure, and a second base structure, which is the blazed structure, on each other, the intermediate region comprises a second optical path difference providing structure obtained by superimposing a third base structure, which is the blazed structure, and a fourth base structure, which is the blazed structure, on each other, the first base structure makes an amount of A-th order diffracted light of the first light flux, which passes through the first base structure, larger than an amount of diffracted light of any other order, makes an amount of B-th order diffracted light of the second light flux, which passes through the first base structure, larger than the amount of the diffracted light of any other order, and makes an amount of C-th order diffracted light of the third light flux, which passes through the first base structure, larger than the amount of the diffracted light of any other order, the second base structure makes an amount of D-th order diffracted light of the first light flux, which passes through the second base structure, larger than the amount of the diffracted light of any other order, makes an amount of E-th order diffracted light of the second light flux, which passes through the second base structure, larger than the amount of the diffracted light of any other order, and makes an amount of F-th order diffracted light of the third light flux, which passes through the second base structure, larger than the amount of the diffracted light of any other order, the third base structure makes the amount of A-th order diffracted light of the first light flux, which passes through the third base structure, larger than the amount of the diffracted light of any other order, makes the amount of B-th order diffracted light of the second light flux, which passes through the third base structure, larger than the amount of the diffracted light of any other order, and makes the amount of C-th order diffracted light of the third light flux, which passes through the third base structure, larger than the amount of the diffracted light of any other order, the fourth base structure makes the amount of D-th order diffracted light of the first light flux, which passes through the fourth base structure, larger than the amount of the diffracted light of any other order, makes the amount of E-th order diffracted light of the second light flux, which passes through the fourth base structure, larger than the amount of the diffracted light of any other order, and makes the amount of F-th order diffracted light of the third light flux, which passes through the fourth base structure, larger than the amount of the diffracted light of any other order, A, B, C, D, E, and F satisfy $|A|=1$,
$|B|=1$,
$|C|=1$,
$|D|=2$,
$|E|=1$, and
$|F|=1$, respectively, and a pitch of each of the first base structure, the second base structure, the third base structure, and the fourth base structure is with a positive sign when a step of the base structure faces opposite to an optical axis and with a negative sign when the step of the base structure faces to the optical axis, there is a boundary between the central region and the intermediate region, a pitch P2 of the second base structure in a position closest to the boundary and a pitch P4 of the fourth base structure in a position closest to the boundary satisfy a following equation (1) in consideration of the sign of the pitch:

$$P4-P2<0 \tag{1}$$

where, pitch $P(h)=\lambda B/(\Sigma(2i \times C_{2i} \times h^{2i-1}))$ is satisfied when an optical path difference function, which defines the base structure, is represented by $\Phi(h)=\Sigma(C_{2i}h^{2i} \times \lambda \times m/\lambda B)$, where $\lambda$ represents a wavelength used, m represents a diffraction order, $\lambda B$ represents a manufacturing wavelength, and h represents a distance in a direction perpendicular to the optical axis from the optical axis.

2. The objective lens according to claim 1, wherein, when a width of an annular zone of the second base structure closest to the boundary is represented by $\Delta T2$ and a width of an annular zone of the fourth base structure closest to the boundary is represented by $\Delta T4$, and a width of the annular zone of each of the first base structure, the second base structure, the third base structure, and the fourth base structure is with the positive sign when the step of the base structure faces opposite to the optical axis and with the negative sign when the step of the base structure faces to the optical axis, a following equation is satisfied:

$$\Delta T4 - \Delta T2 < 0 \qquad (2).$$

3. The objective lens according to claim 1, wherein a step of the second base structure in a position closest to the boundary faces to the optical axis.

4. The objective lens according to claim 1, wherein a step of the second base structure in a position closest to the boundary and a step of the fourth base structure in a position closest to the boundary face to a same direction.

5. The objective lens according to claim 1, wherein a pitch P1 of the first base structure in a position closest to the boundary and a pitch P3 of the third base structure in a position closest to the boundary satisfy a following equation (3) in consideration of the sign of the pitch:

$$P3 - P1 < 0 \qquad (3).$$

6. The objective lens according to claim 1, wherein a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy a following equation (4) in consideration of the sign:

$$|P3 - P1| < |P4 - P2| \qquad (4).$$

7. The objective lens according to claim 1, wherein the third light flux, which passes through the second optical path difference providing structure, generates an over-spherical aberration on the information recording surface of the third optical disc.

8. The objective lens according to claims 1, wherein steps closest to the boundary of the first base structure and the third base structure face to the optical axis, steps closest to the boundary of the second base structure and the fourth base structure face to the optical axis, a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (5) and (6) in consideration of the sign of the pitch:

$$P3 < P1 < 0 \qquad (5), \text{ and}$$

$$P4 < P2 < 0 \qquad (6).$$

9. The objective lens according to claim 8, wherein a following equation (7) is satisfied when a focal distance of the objective lens in the first light flux is represented by f1 (mm):

$$2.0 \le f1 \le 3.5 \qquad (7).$$

10. The objective lens according to claim 1, wherein steps of the first base structure and the third base structure closest to the boundary face opposite to the optical axis, steps of the second base structure and the fourth base structure closest to the boundary face to the optical axis, and a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (8) and (9) in consideration of the sign of the pitch:

$$P1 > P3 > 0 \qquad (8), \text{ and}$$

$$P4 < P2 < 0 \qquad (9).$$

11. The objective lens according to claim 10, wherein a following equation (10) is satisfied when a focal distance of the objective lens in the first light flux is represented by f1 (mm):

$$1.5 \le f1 \le 2.5 \qquad (10).$$

12. The objective lens according to claim 1, wherein steps of the first base structure and the third base structure closest to the boundary face opposite to the optical axis, steps of the second base structure and the fourth base structure closest to the boundary face opposite to the optical axis, and a pitch P1 of the first base structure in a position closest to the boundary, a pitch P3 of the third base structure in a position closest to the boundary, the pitch P2 of the second base structure in the position closest to the boundary, and the pitch P4 of the fourth base structure in the position closest to the boundary satisfy following equations (11) and (12) in consideration of sign:

$$P1 > P3 > 0 \qquad (11), \text{ and}$$

$$P2 > P4 > 0 \qquad (12).$$

13. The objective lens according to claim 12, wherein a following equation (13) is satisfied when a focal distance of the objective lens in the first light flux is represented by f1 (mm):

$$1.0 \le f1 \le 1.8 \qquad (13).$$

14. The objective lens according to claim 1, wherein a following equation (14) is satisfied when paraxial power of the first base structure in the third light flux is represented by PW1, paraxial power of the second base structure in the third light flux is represented by PW2, paraxial power of the third base structure in the third light flux is represented by PW3, and paraxial power of the fourth base structure in the third light flux is represented by PW4:

$$0 < (PW1/PW3)/(PW2/PW4) < 0.9 \qquad (14).$$

15. The objective lens according to claim 14, wherein a following equation (14') is satisfied:

$$0.65 \le (PW1/PW3)/(PW2/PW4) < 0.9 \qquad (14').$$

16. An optical pickup device, comprising the objective lens according to claim 1.

17. The optical pickup device according to claim 16, comprising: a coupling lens through which at least the first light flux and the second light flux pass; and an actuator which moves the coupling lens in a direction of an optical axis, wherein;
when the first light flux passes, the coupling lens is capable of moving in the direction of the optical axis by the actuator, and
when the second light flux passes, a position of the coupling lens in the direction of the optical axis is fixed.

18. An objective lens used in an optical pickup device, the optical pickup device comprising a first light source which emits a first light flux at a first wavelength λ1 (nm), a second light source which emits a second light flux at a second wavelength λ2 (nm) wherein λ2>λ1, and a third light source which emits a third light flux at a third wavelength λ3 (nm) wherein λ3>λ2 for recording and/or reproducing information of a first optical disc comprising a protective substrate with a thickness of t1 by using the first light flux, recording and/or reproducing information of a second optical disc comprising a protective substrate with a thickness of t2 wherein t1<t2 by using the second light flux, and recording and/or reproducing information of a third optical disc comprising a protective substrate with a thickness of t3 wherein t2<t3 by using the third light flux, wherein;

the objective lens is a single lens, an optical surface of the objective lens at least comprises a central region, an intermediate region around the central region, and a peripheral region around the intermediate region, the objective lens converges the first light flux, which passes through the central region, on an information recording surface of the first optical disc such that the information is recorded and/or reproduced, converges the second light flux, which passes through the central region, on an information recording surface of the second optical disc such that the information is recorded and/or reproduced, and converges the third light flux, which passes through the central region, on an information recording surface of the third optical disc such that the information is recorded and/or reproduced, the objective lens converges the first light flux, which passes through the intermediate region, on the information recording surface of the first optical disc such that the information is recorded and/or reproduced, converges the second light flux, which passes through the intermediate region, on the information recording surface of the second optical disc such that the information is recorded and/or reproduced, and does not converge the third light flux, which passes through the intermediate region, on the information recording surface of the third optical disc such that the information is recorded and/or reproduced, the objective lens converges the first light flux, which passes through the peripheral region on the information recording surface of the first optical disc such that the information is recorded and/or reproduced, does not converge the second light flux, which passes through the peripheral region, on the information recording surface of the second optical disc such that the information is recorded and/or reproduced, and does not converge the third light flux, which passes through the peripheral region, on the information recording surface of the third optical disc such that the information is recorded and/or reproduced, the central region comprises a first optical path difference providing structure obtained by superimposing a first base structure, which is a blazed structure, and a second base structure, which is the blazed structure, on each other, the intermediate region includes a second optical path difference providing structure obtained by superimposing a third base structure, which is the blazed structure, and a fourth base structure, which is the blazed structure, on each other, the first base structure makes an amount of A-th order diffracted light of the first light flux, which passes through the first base structure, larger than an amount of diffracted light of any other order, makes an amount of B-th order diffracted light of the second light flux, which passes through the first base structure, larger than the amount of the diffracted light of any other order, and makes an amount of C-th order diffracted light of the third light flux, which passes through the first base structure, larger than the amount of the diffracted light of any other order, the second base structure makes an amount of D-th order diffracted light of the first light flux, which passes through the second base structure, larger than the amount of the diffracted light of any other order, makes an amount of E-th order diffracted light of the second light flux, which passes through the second base structure, larger than the amount of the diffracted light of any other order, and makes an amount of F-th order diffracted light of the third light flux, which passes through the second base structure, larger than the amount of the diffracted light of any other order, the third base structure makes the amount of A-th order diffracted light of the first light flux, which passes through the third base structure, larger than the amount of the diffracted light of any other order, makes the amount of B-th order diffracted light of the second light flux, which passes through the third base structure, larger than the amount of the diffracted light of any other order, and makes the amount of C-th order diffracted light of the third light flux, which passes through the third base structure, larger than the amount of the diffracted light of any other order, the fourth base structure makes the amount of D-th order diffracted light of the first light flux, which passes through the fourth base structure, larger than the amount of the diffracted light of any other order, makes the amount of E-th order diffracted light of the second light flux, which passes through the fourth base structure, larger than the amount of the diffracted light of any other order, and makes the amount of F-th order diffracted light of the third light flux, which passes through the fourth base structure, larger than the amount of the diffracted light of any other order, A, B, C, D, E, and F satisfy

|A|=1,
|B|=1,
|C|=1,
|D|=2,
|E|=1, and
|F|=1, respectively, and, there is a boundary between the central region and the intermediate region, a width of an annular zone of the second base structure closest to the boundary is represented by $\Delta T2$ and a width of the annular zone of the fourth base structure closest to the boundary is represented by $\Delta T4$, and a width of an annular zone of each of the first base structure, the second base structure, the third base structure, and the fourth base structure is with a positive sign when a step of the base structure faces opposite to an optical axis and is with a negative sign when the step of the base structure faces to the optical axis, a following equation is satisfied:

$$\Delta T4 - \Delta T2 < 0 \qquad (2).$$

19. The objective lens according to claim 18, wherein a step of the second base structure in a position closest to the boundary faces to the optical axis.

20. The objective lens according to claim 18, wherein a step of the second base structure in a position closest to the boundary and a step of the fourth base structure in a position closest to the boundary face to a same direction.

* * * * *